US011200104B2

(12) United States Patent
Adiletta et al.

(10) Patent No.: US 11,200,104 B2
(45) Date of Patent: Dec. 14, 2021

(54) TECHNOLGIES FOR MILLIMETER WAVE RACK INTERCONNECTS

(71) Applicant: INTEL CORPORATION, Santa Clara, CA (US)

(72) Inventors: Matthew J. Adiletta, Bolton, MA (US); Myles Wilde, Charlestown, MA (US); Aaron Gorius, Upton, MA (US); Michael T. Crocker, Portland, OR (US); Paul H. Dormitzer, Acton, MA (US); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/346,341

(22) PCT Filed: Nov. 29, 2017

(86) PCT No.: PCT/US2017/063759
§ 371 (c)(1),
(2) Date: Apr. 30, 2019

(87) PCT Pub. No.: WO2018/102443
PCT Pub. Date: Jun. 7, 2018

(65) Prior Publication Data
US 2019/0307014 A1 Oct. 3, 2019

Related U.S. Application Data

(60) Provisional application No. 62/427,268, filed on Nov. 29, 2016, provisional application No. 62/584,401, filed on Nov. 10, 2017.

(30) Foreign Application Priority Data

Aug. 30, 2017 (IN) .............................. 201741030632

(51) Int. Cl.
*H01P 5/08* (2006.01)
*H01P 5/00* (2006.01)
(Continued)

(52) U.S. Cl.
CPC ........ *G06F 11/0709* (2013.01); *G06F 11/079* (2013.01); *G06F 11/0751* (2013.01);
(Continued)

(58) Field of Classification Search
CPC .... H01P 5/00; H01P 5/08; H04B 3/52; H05K 7/1491
(Continued)

(56) References Cited

U.S. PATENT DOCUMENTS 4,863,232 A * 9/1989 Kwa ........................ G02B 6/32
385/89
4,890,894 A * 1/1990 Kwa ........................ G02B 6/32
385/56
(Continued)

FOREIGN PATENT DOCUMENTS

| CN | 102150323 A | 8/2011 |
|---|---|---|
| CN | 102882811 A | 1/2013 |

(Continued)

OTHER PUBLICATIONS

PCT Search Report and Written Opinion prepared for PCT/US2017/063759, completed Mar. 16, 2018.
(Continued)

*Primary Examiner* — Adrian S Wilson
(74) *Attorney, Agent, or Firm* — Compass IP Law PC

(57) ABSTRACT

Racks and rack pods to support a plurality of sleds are disclosed herein. Switches for use in the rack pods are also disclosed herein. A rack comprises a plurality of sleds and a plurality of electromagnetic waveguides. The plurality of sleds are vertically spaced from one another. The plurality of (Continued)

electromagnetic waveguides communicate data signals between the plurality of sleds.

24 Claims, 16 Drawing Sheets

(51) Int. Cl.

| | | |
|---|---|---|
| *H04B 3/52* | (2006.01) | |
| *H05K 7/14* | (2006.01) | |
| *G06F 11/07* | (2006.01) | |
| *G06F 11/30* | (2006.01) | |
| *G06F 9/50* | (2006.01) | |
| *G06F 11/34* | (2006.01) | |
| *H04Q 11/00* | (2006.01) | |
| *G06F 16/28* | (2019.01) | |

(52) U.S. Cl.
CPC ...... *G06F 11/3006* (2013.01); *G06F 11/3055* (2013.01); *H05K 7/1487* (2013.01); *H05K 7/1491* (2013.01); *G06F 9/505* (2013.01); *G06F 9/5083* (2013.01); *G06F 11/3034* (2013.01); *G06F 11/3409* (2013.01); *G06F 16/285* (2019.01); *H04Q 11/0005* (2013.01); *H05K 7/1447* (2013.01); *H05K 7/1492* (2013.01)

(58) Field of Classification Search
USPC .................................................. 361/724–728
See application file for complete search history.

(56) References Cited

U.S. PATENT DOCUMENTS

| | | | |
|---|---|---|---|
| 7,929,474 B2 | 4/2011 | Pettus et al. | |
| 9,496,592 B2* | 11/2016 | Adiletta | ............... H01P 3/10 |
| 9,537,794 B2 | 1/2017 | Pettus et al. | |
| 10,374,726 B2* | 8/2019 | Adiletta | ............... H04B 10/803 |
| 2006/0234787 A1* | 10/2006 | Lee | ............... H05K 7/1412 |
| | | | 455/575.7 |
| 2009/0028177 A1 | 1/2009 | Pettus et al. | |
| 2009/0234936 A1* | 9/2009 | Bandholz | ............. H05K 7/1492 |
| | | | 709/220 |
| 2011/0228779 A1* | 9/2011 | Goergen | ................. H04L 49/40 |
| | | | 370/392 |
| 2012/0311127 A1* | 12/2012 | Kandula | ............... H04W 16/28 |
| | | | 709/224 |
| 2013/0058329 A1 | 3/2013 | Warke et al. | |
| 2013/0107853 A1 | 5/2013 | Pettus et al. | |
| 2013/0287397 A1 | 10/2013 | Frankel et al. | |
| 2014/0285277 A1* | 9/2014 | Herbsommer | ............ H01P 3/16 |
| | | | 333/1 |
| 2015/0280827 A1* | 10/2015 | Adiletta | .................... H01P 3/10 |
| | | | 398/116 |
| 2015/0293867 A1 | 10/2015 | Steinmacher-Burow | |
| 2016/0173193 A1 | 6/2016 | Zhu | |

FOREIGN PATENT DOCUMENTS

| | | |
|---|---|---|
| CN | 104009941 A | 8/2014 |
| CN | 106063397 A | 10/2016 |
| EP | 1361671 A1 | 11/2003 |
| EP | 2737718 A1 | 6/2014 |

OTHER PUBLICATIONS

Hamza, Abdelbaset S. et al., "Wireless Communication in Data Centers: A Survey", CSE Journal Articles, 140, Jan. 2016, 25 pages.

Kim, Yanghyo et al., "High-Speed mm-Wave Date-Link Based on Hollow Plastic Cable and CMOS Transceiver", IEEE Microwave and Wireless Components Letters, vol. 23, No. 12, Dec. 2013, 3 pages.

Vardhan, Hars et al., "Wireless Data Center with Millimeter Wave Network", IEEE Globecom, 2010, 6 pages.

Zhou, Xia et al., "Mirror Mirror on the Ceiling: Flexible Wireless Links for Data Centers", SIGCOMM '12, ACM SIGCOMM 2012 Conference, Helsinki, Finland, Aug. 2012, 12 pages.

Kim, Yanghuo, et al., "High-Speed mm-Wave Data -Link Based on Hollow Plastic Cable and COS Transceiver" IEEE Micorwave and Wireless Components Letters, IEEE Service Center, New York, NY, US, vol. 23, No. 12, Oct. 19, 2013, 3 pages.

Partial Supplementary European Search Report for Patent Application No. 17876212.6, dated Dec. 11, 2020, 16 pages.

Extended European Search Report for Patent Application No. 17876212.6, dated Feb. 23, 2021, 14 pages.

Ferri, Jordi, "Electromagnetic Interference in the Data Center: To Shield Or Not To Shield", INTERFERENCE TECHNOLOGY, https://interferencetechnology.com/electromagnetic-interference-in-the-data-center-to-shield-or-not-to-shield/, Sep. 5, 2011, 7 pages.

First Chinese Office Action of P.R. China State Intellectual Property Office for Patent Application No. 201780067298.X, dated May 26, 2021, 10 pages.

* cited by examiner

TECHNOLGIES FOR MILLIMETER WAVE RACK INTERCONNECTS

CROSS-REFERENCE TO RELATED APPLICATION

The present application is a national stage entry under 35 USC § 371(b) of International Application No. PCT/US2017/063759, filed Nov. 29, 2017 and claims the benefit of U.S. Provisional Patent Application No. 62/427,268, filed Nov. 29, 2016, Indian Provisional Patent Application No. 201741030632, filed Aug. 30, 2017, and U.S. Provisional Patent Application No. 62/584,401, filed Nov. 10, 2017.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional rack systems are self-contained physical support structures that include a number of pre-defined server spaces. A corresponding server may be mounted in each pre-defined server space. When mounted in the server spaces of a single rack, the servers may be spaced such that communicatively coupling the servers to one another by conventional electrical cables or printed circuit boards is impractical. Additionally, when servers are mounted in the server spaces of multiple racks that are spaced from one another, communicatively coupling the servers to one another by such devices may not be feasible.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
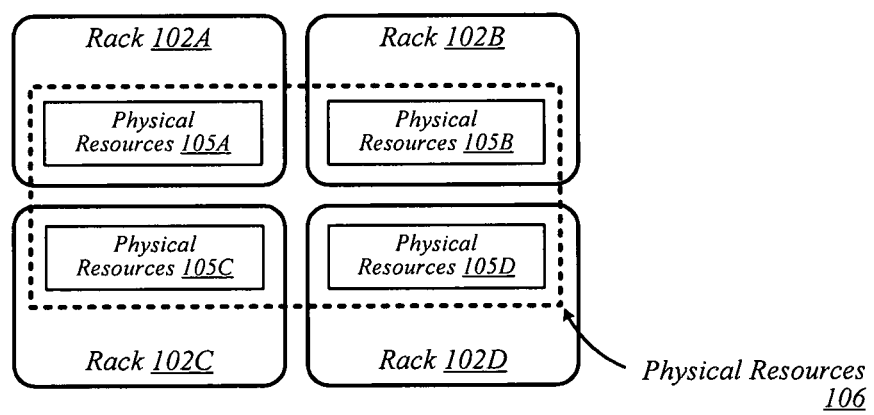
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
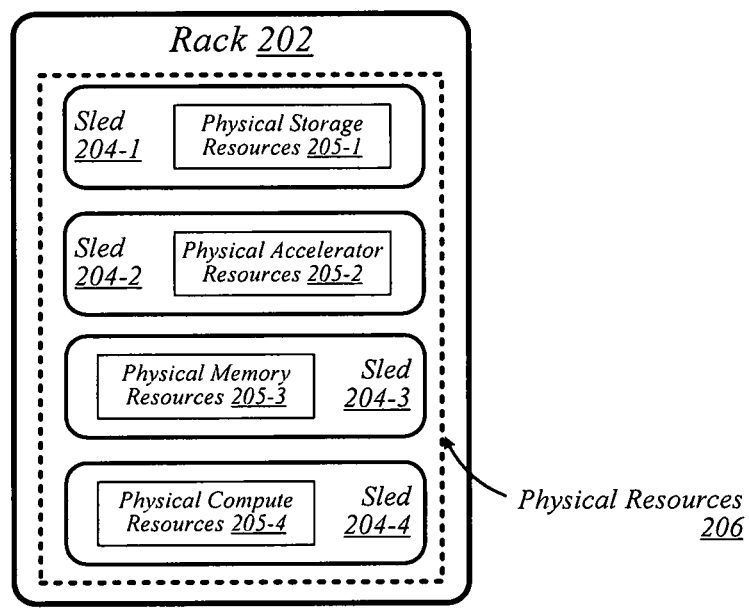
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
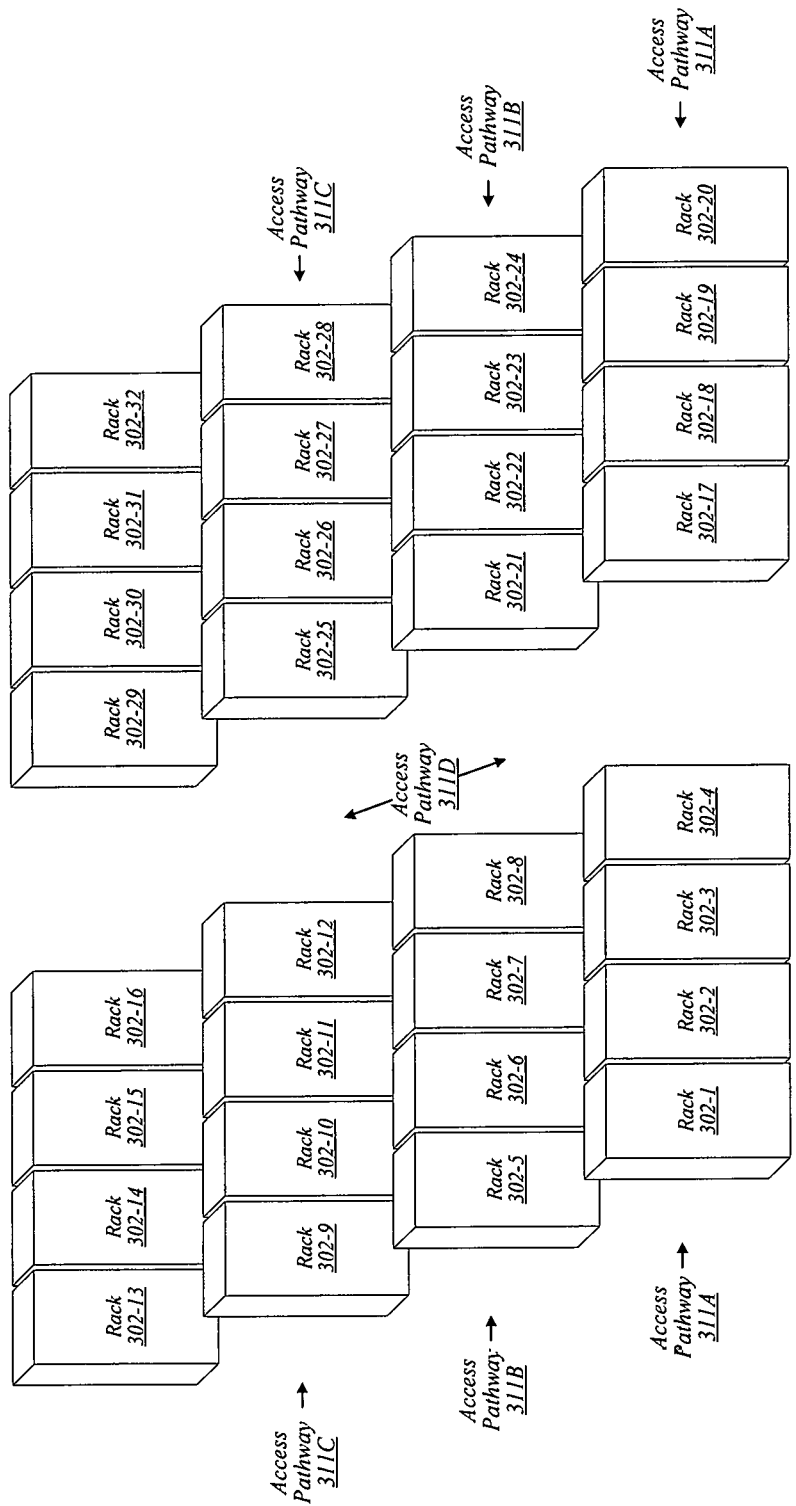
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
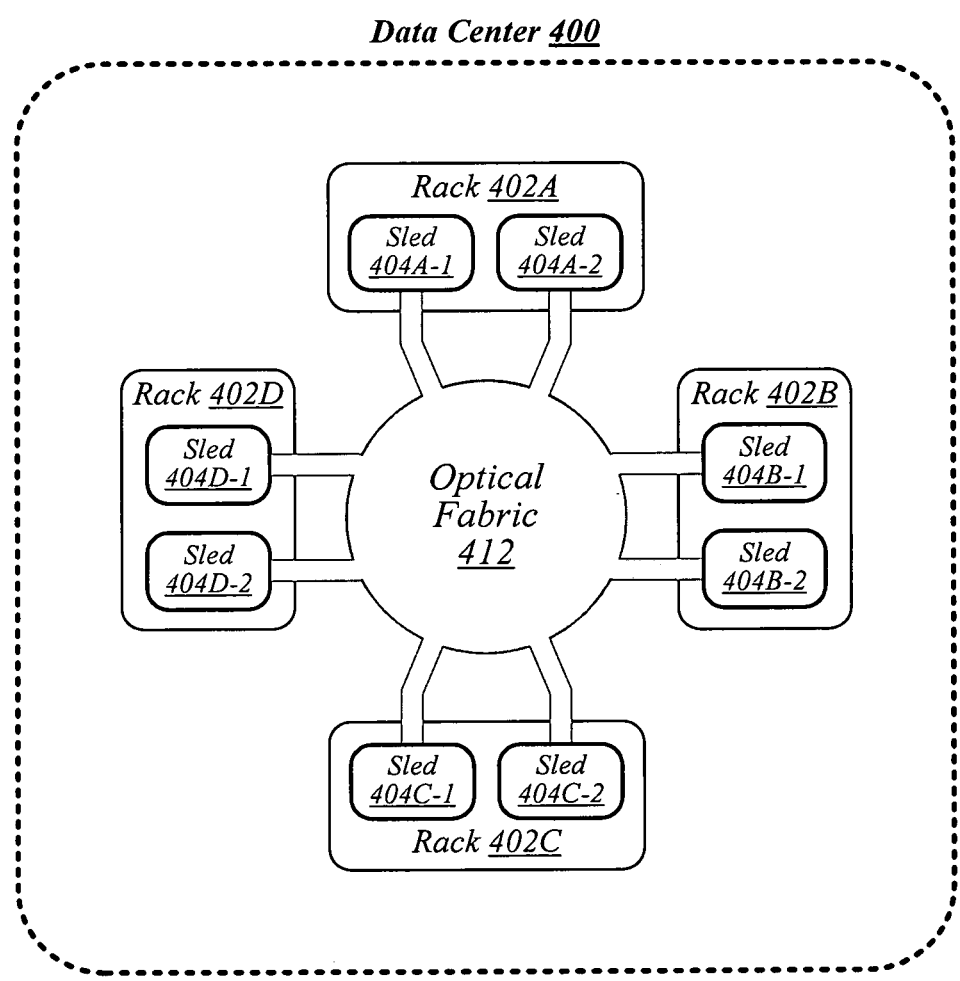
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
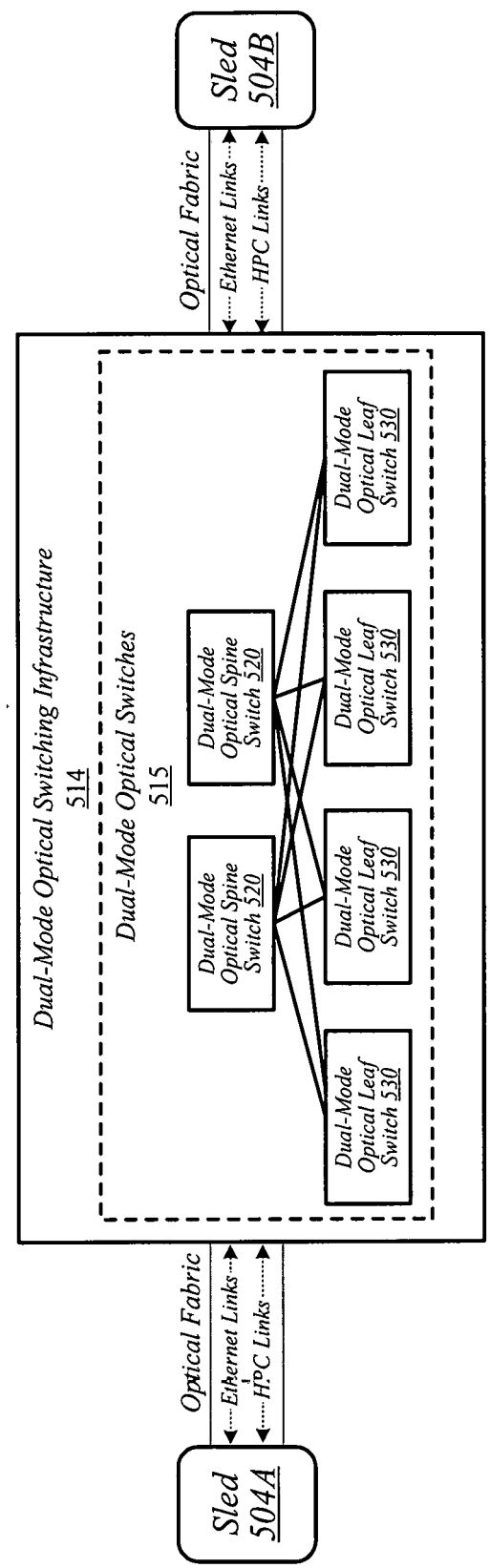
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
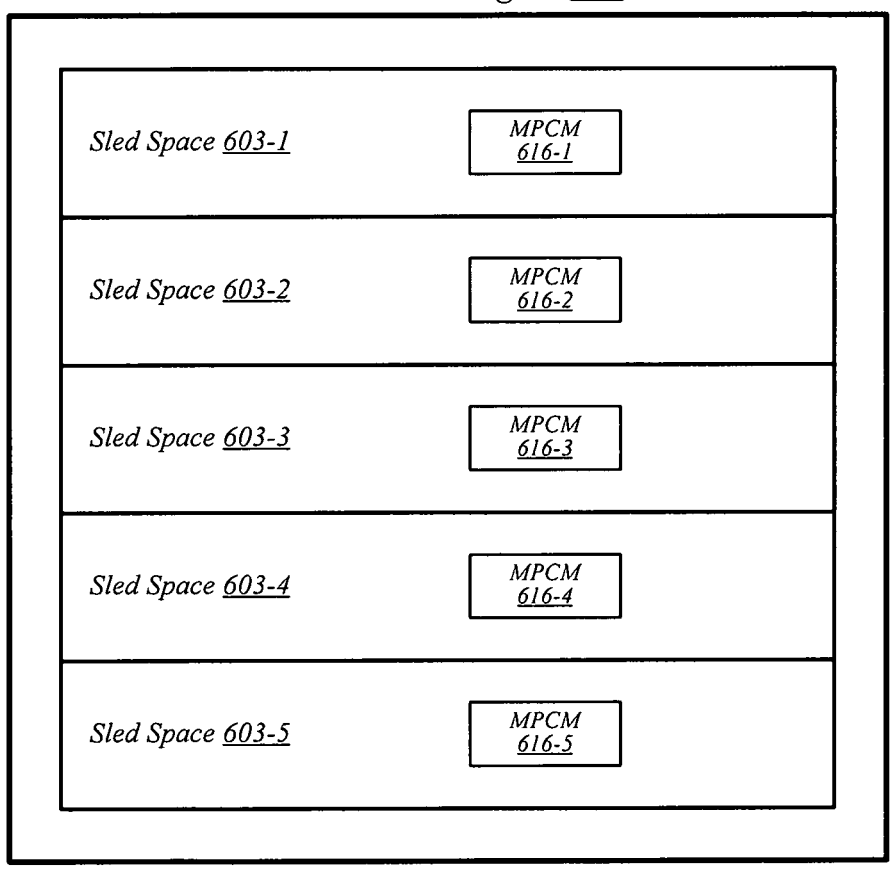
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
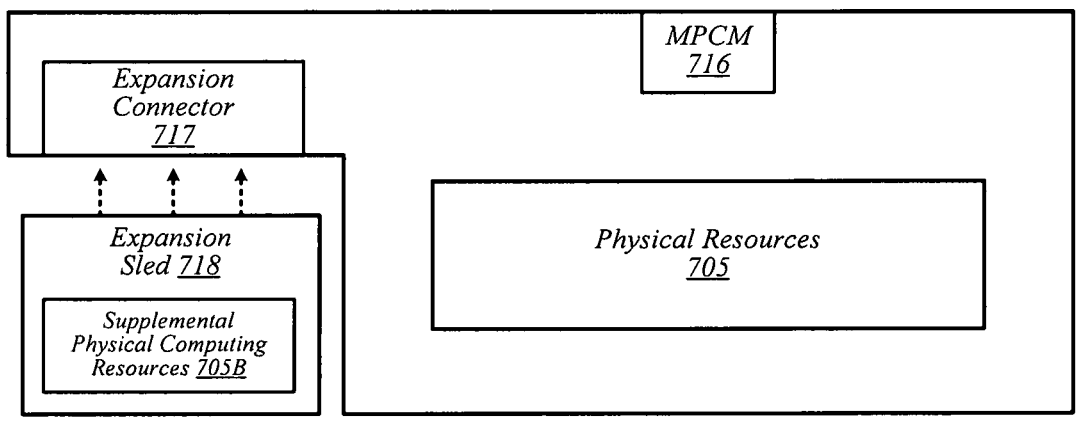
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
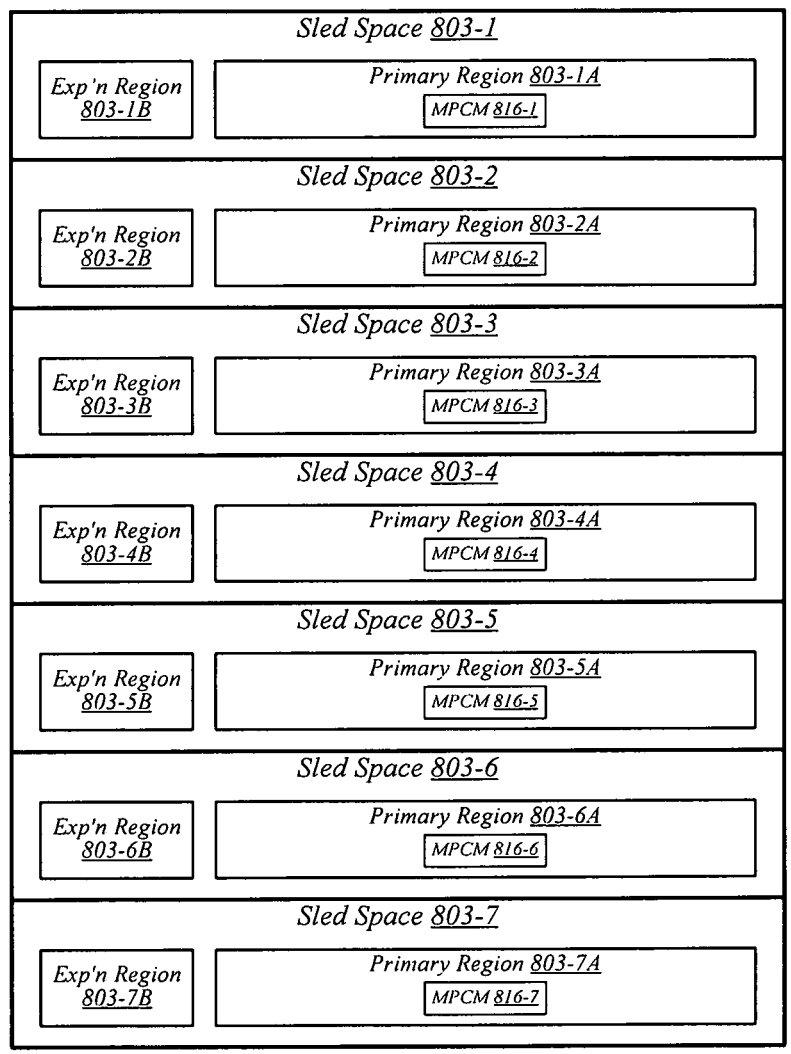
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
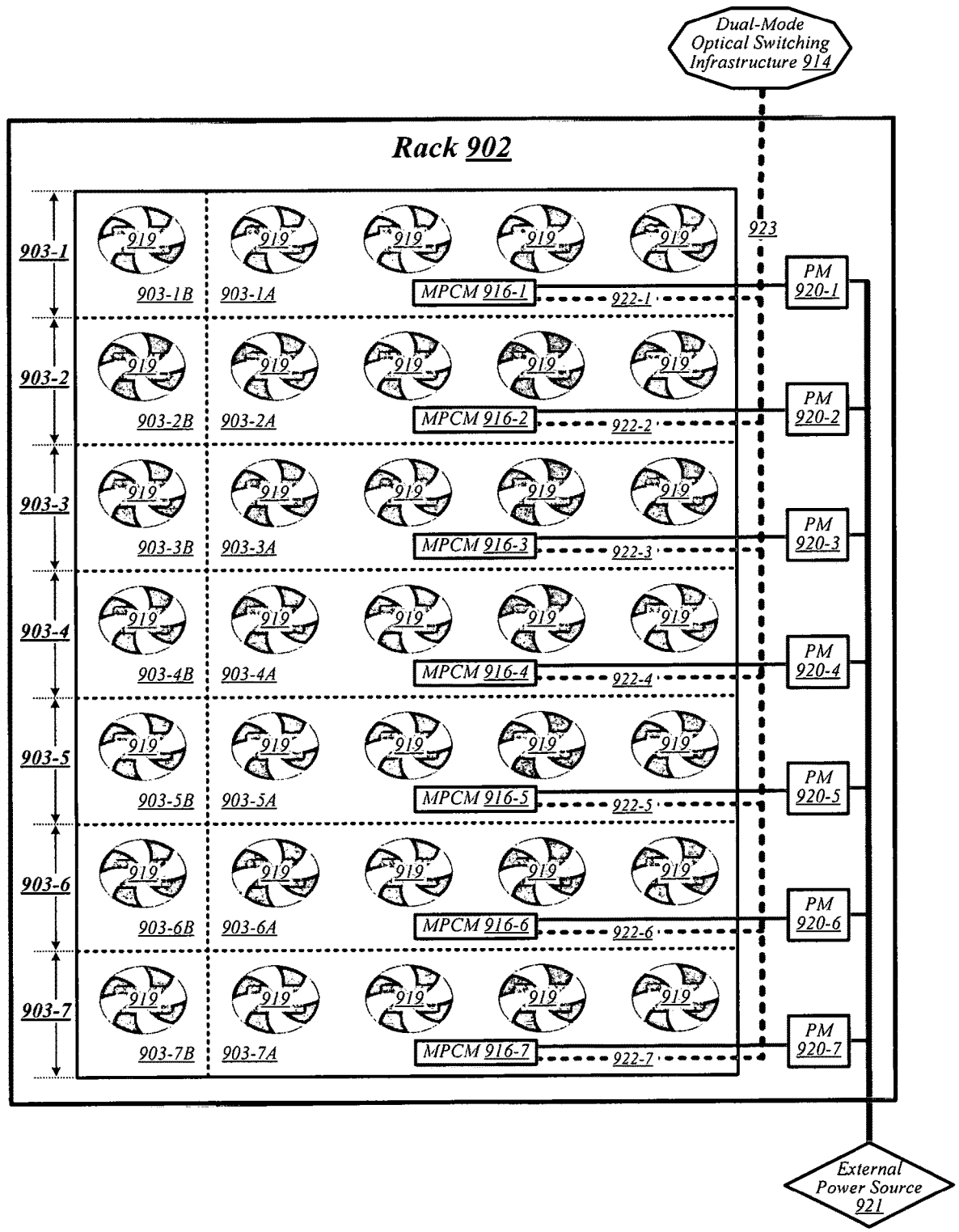
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
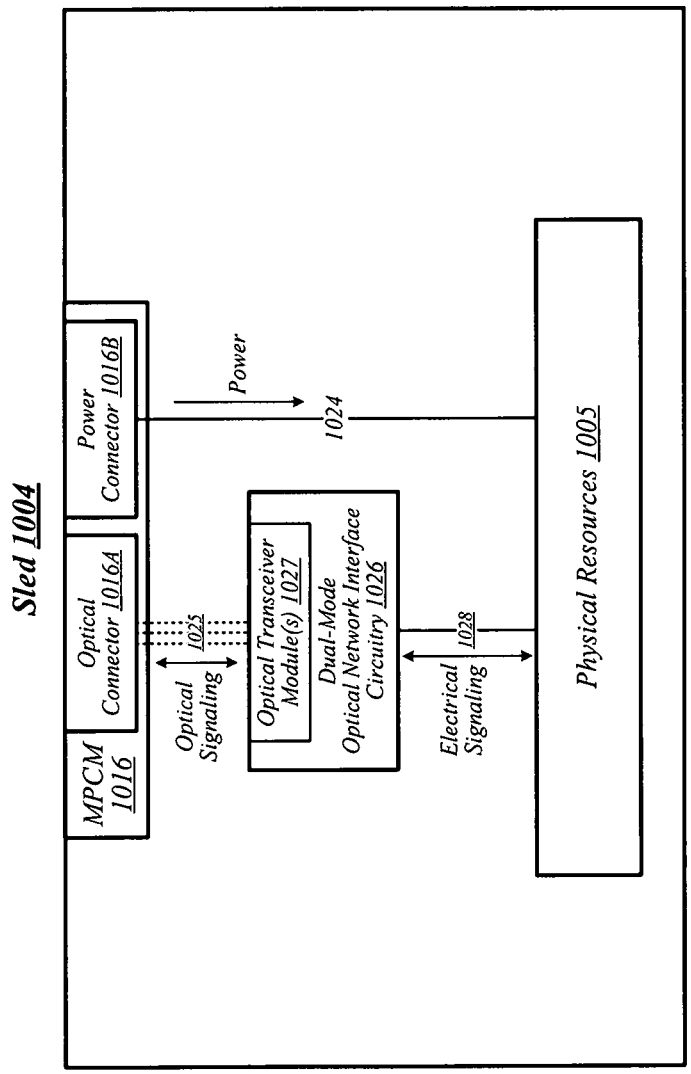
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
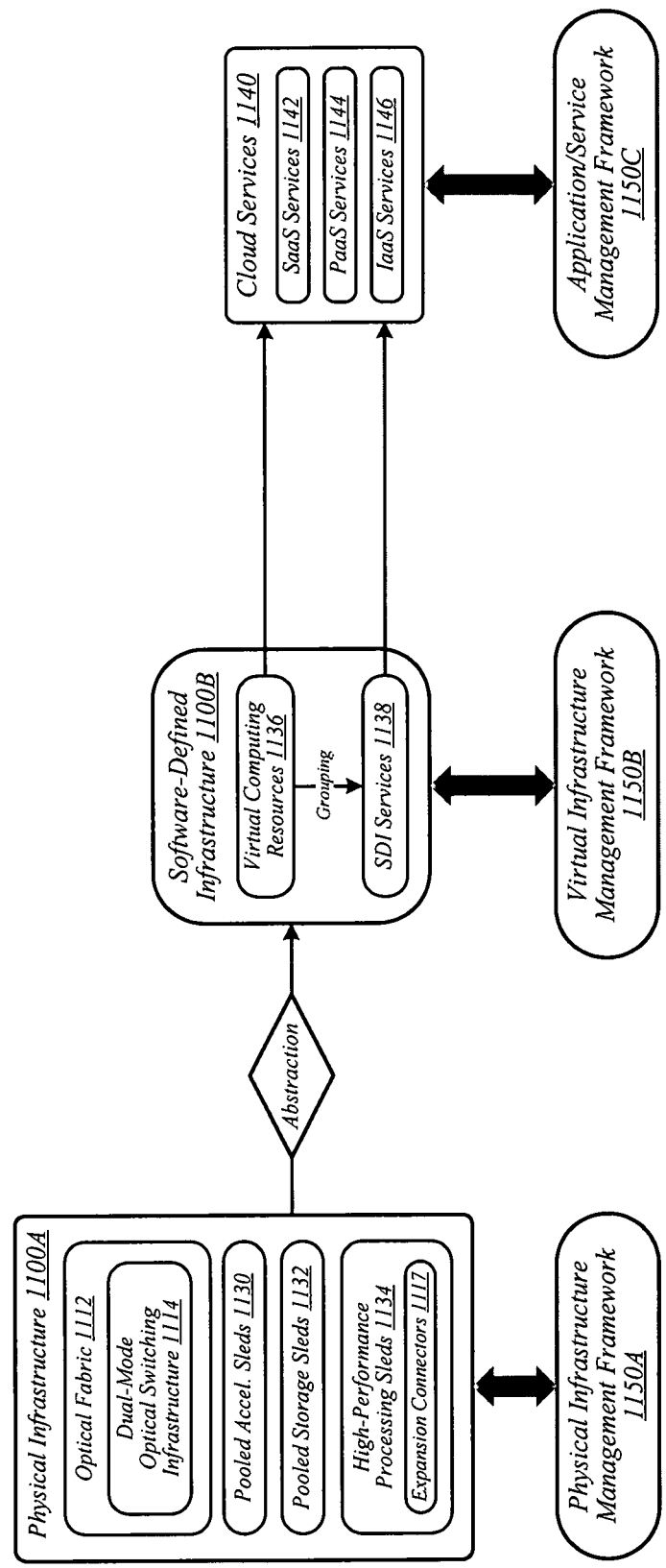
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Referring now to FIGS. 12-20, various embodiments of sleds, racks, rows, pods, and switches may be connected with use of electromagnetic waveguides configured to carry millimeter wave signals at a carrier frequency of, e.g., 60-120 GHz. Use of millimeter wave signals in electromagnetic waveguides may allow for high-bandwidth signals (e.g., 50-100 gigabits per second per waveguide) over relatively long distances (e.g., 10 feet) at a relatively low cost. In particular, millimeter wave signals in electromagnetic waveguides may be able to carry signals longer than electrical cables at similar bitrates and may be implemented more cheaply than an optical connection. For example, in a first embodiment, electromagnetic waveguides 1206 carrying millimeter wave signals may be used to connect each compute sled sled 1204C in a rack 1202 to a central memory sled 1204M. In a second embodiment, electromagnetic waveguides up to 10 feet long may be used to connect a large number of sleds 1304 (such as 128 sleds 1304) to a single switch coupling point 1352. In a third embodiment, electromagnetic waveguides 2006 may provide backplane connections to several line cards 1922 in a pod switch 1842.

Figure 12:
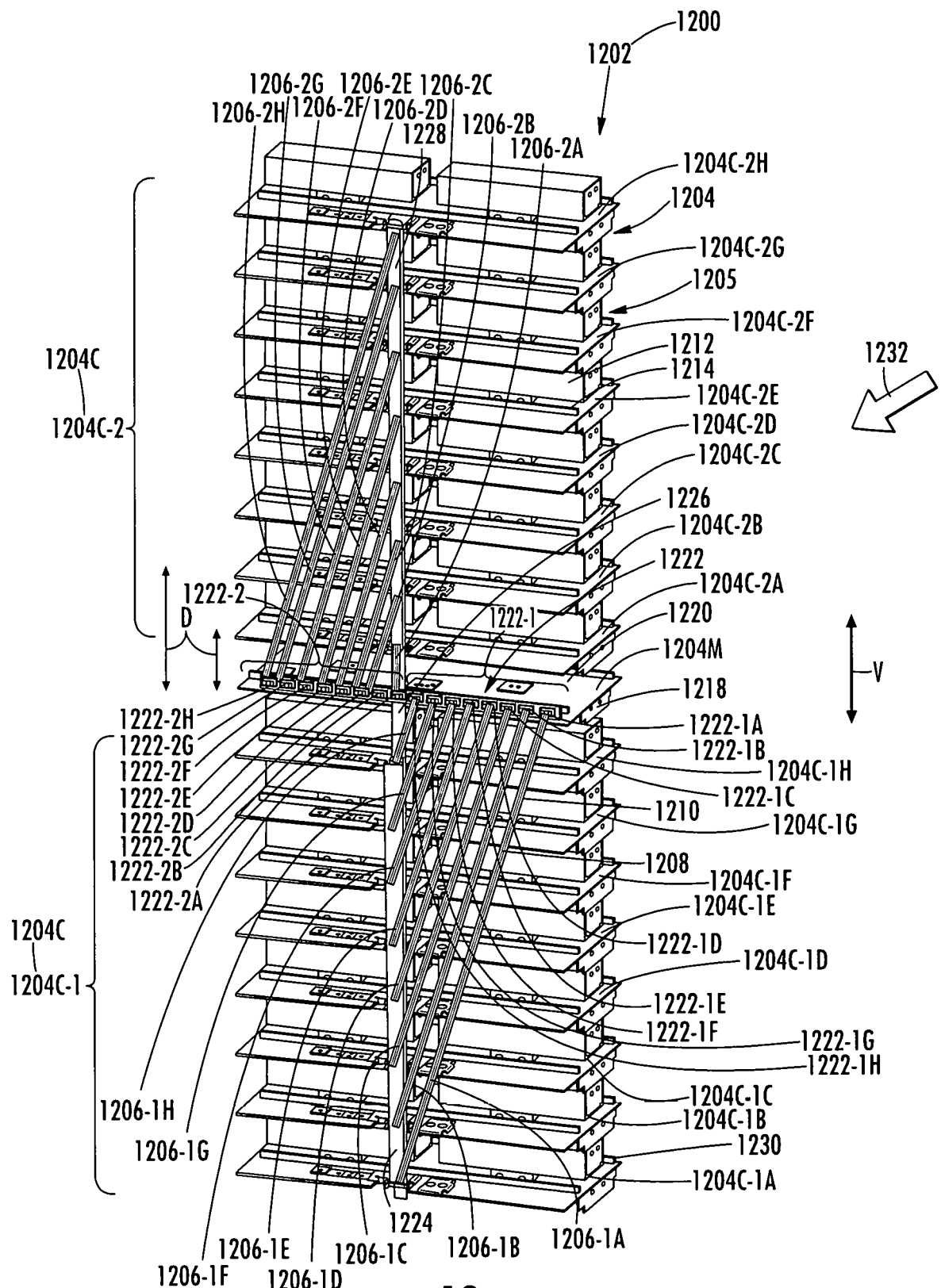
FIG. 12 is a partial perspective view of at least one embodiment of a rack of the data center of FIGS. 1, 3, and 4 with multiple compute sleds each communicatively coupled to a memory sled by an electromagnetic waveguide.

Referring now to FIG. 12, in another embodiment, an illustrative data center 1200 includes one or more racks 1202 configured to house or otherwise receive one or more sleds 1204 for mounting therein. The data center 1200 may generally be representative of any type of data center or other type of computing network. Accordingly, the data center 1200 may be similar to, embodied as, or otherwise form a part of, the data centers 100, 300, 400, 1100 described above. The rack 1202 may house computing equipment comprising a set of physical resources, which may include processors, co-processors, accelerators, field programmable gate arrays (FPGAs), memory, and storage, for example. The rack 1202 may therefore be similar to, embodied as, or otherwise form a part of, the racks 102A-102D, 202, 302-1-302-32, 402A-402D, 902 described above. Additionally, in some embodiments, the rack 1202 may incorporate architecture similar to the aforementioned rack architectures 600, 800. Each of the sleds 1204 may be embodied as a circuit board on which components such as CPUs, memory, and/or other components are placed. As such, each of the sleds 1204 may be similar to, embodied as, or otherwise form a part of, the sleds 204-1-204-4, 404A-1, 404A-2, 404B-1, 404B-2, 404C-1, 404C-2, 404D-1, 404D-2, 504A, 504B, 704, 1004, 1130, 1132, 1134 described above. For example, each sled 1204 may be embodied as a compute sled, a memory sled, an accelerator sled, a data storage sled, and/or other physical resource sled.

Each of the illustrative sleds 1204 is housed or otherwise received by a corresponding server space 1205 of the rack 1202. When the sleds 1204 are positioned in the server spaces 1205, the sleds 1204 are spaced from one another in a vertical direction V. The sleds 1204 illustratively include compute sleds 1204C and a memory sled 1204M. As discussed in greater detail below, each of the compute sleds 1204C is communicatively coupled to the memory sled 1204M by an electromagnetic waveguide 1206.

Each of the illustrative electromagnetic waveguides 1206 extends between the memory sled 1204M and a corresponding one of the compute sleds 1204C to communicatively couple the memory sled 1204M to the corresponding compute sled 1204C. Each electromagnetic waveguide 1206 is sized to span a vertical distance D between the memory sled 1204M and the corresponding compute sled 1204C. Compared to other configurations, the use of the waveguides 1206 to communicatively couple the memory sled 1204M to the compute sleds 1204C may provide one or more benefits. For example, in some configurations, the vertical distance D between the memory sled 1204M and a corresponding compute sled 1204C may be such that coupling those components to one another by a conventional electrical cable or a printed circuit board (PCB) is impractical or otherwise undesirable. In such configurations, use of the electromagnetic waveguides 1206 may be desirable. In other configurations, coupling the memory sled 1204M to a corresponding compute sled 1204C by a conventional electrical cable or a printed circuit board may be associated with undesirable cost. In those configurations, use of the electromagnetic waveguides 1206 may be preferable.

Each of the electromagnetic waveguides 1206 illustratively includes, or is otherwise embodied as, a structure capable of carrying electromagnetic waves between the sleds 1204. Each electromagnetic waveguide 1206 is configured to communicate millimeter wave (MMW) data signals between the memory sled 1204M and a corresponding compute sled 1204C. In the illustrative embodiment, each electromagnetic waveguide 1206 is configured to communicate the millimeter wave data signals between the memory sled 1204M and the corresponding compute sled 1204C at about 50 to 100 gigabits per second during operation of the rack 1202. Additionally, in the illustrative embodiment, the millimeter wave data signals have a carrier frequency range of about 60 to 120 gigahertz.

Each of the illustrative electromagnetic waveguides 1206 includes a core 1208 that is formed from a dielectric material. In some embodiments, the core 1208 of each electromagnetic waveguide 1206 may be formed from a solid dielectric material, such as a polymeric material, porcelain, or glass, for example. The core may be any suitable dimension, such as a rectangular cross-section with dimensions of 1.4 by 0.7 millimeters. In other embodiments, the core 1208 of each electromagnetic waveguide 1206 may be formed from one another suitable dielectric material, such as a gas or liquid dielectric material, for example.

Each of the illustrative electromagnetic waveguides 1206 also includes a metallic coating 1210 that is applied to the core 1208. In some embodiments, the metallic coating 1210 may include, or otherwise be embodied as, a foil sheath applied to the core 1208. Additionally, in some embodiments, the metallic coating 1210 may include, or otherwise be embodied as, a spray-on coating applied to the core 1208. However, in other embodiments, the metallic coating 1210 may omitted from each electromagnetic waveguide 1206 entirely.

Each of the illustrative compute sleds 1204C includes one or more physical resources 1212 and a chassis-less circuit board substrate 1214, as shown in FIG. 12. The one or more physical resources 1212 illustratively include, or are otherwise embodied as, high-power processors. Of course, it should be appreciated that in other embodiments, the one or more physical resources 1212 may include, or be otherwise embodied as, accelerator co-processors storage controllers, and/or network interface controllers, for example. The circuit board substrate 1214 does not include a housing or enclosure, which may improve the airflow over the electrical components of the compute sled 1204C by reducing those structures that may inhibit air flow. In some embodiments, the circuit board substrate 1214 may have a geometric shape configured to reduce the length of the airflow path across the electrical components mounted to the circuit board substrate 1214. Additionally, in some embodiments, the various electrical components mounted to the circuit board substrate 1214 are mounted in corresponding locations such that no two substantively heat-producing electrical components shadow each other.

The compute sleds 1204C illustratively include one set of compute sleds 1204C-1 and another set of compute sleds 1204C-2. The set of compute sleds 1204C-2 is arranged above the set of compute sleds 1204C-1 in the vertical direction V. In the illustrative embodiment, at least a portion of the memory sled 1204M is arranged vertically between the sets of compute sleds 1204C-1, 1204C-2. Additionally, in the illustrative embodiment, each of the sets of compute sleds 1204C-1, 1204C-2 includes eight compute sleds 1204C. Of course, it should be appreciated that in other embodiments, the sets of compute sleds 1204C-1, 1204C-2 may each include another suitable number of compute sleds 1204C. Furthermore, it should be appreciated that in other embodiments, the number of compute sleds 1204C included in the set of compute sleds 1204C-1 may be different from the number of compute sleds 1204C included in the set of compute sleds 1204C-2.

The memory sled 1204M illustratively includes one or more memory devices 1218 and a chassis-less circuit board substrate 1220 that is similar to the circuit board substrate 1214, as shown in FIG. 12. The one or more memory devices 1218 may act as a far memory layer of memory in a memory hierarchy between local DRAM on the compute sled 1204C and storage on, e.g., a storage sled 1132. The one or more memory devices 1218 may include, or otherwise be embodied as, any memory device capable of storing data (e.g., the data carried by millimeter wave data signals) or other information provided by the physical resources 1212 of the compute sleds 1204C. For example, the one or more memory devices 1218 may include, or otherwise be embodied as, dual in-line memory modules (DIMMs), which may support DDR, DDR2, DDR3, DDR4, or DDR5 random access memory (RAM). Of course, in other embodiments, the one or more memory devices 1218 may utilize other memory technologies, including volatile and/or non-volatile memory. For example, types of volatile memory may include, but are not limited to, data rate synchronous dynamic RAM (DDR SDRAM), static random-access memory (SRAM), thyristor RAM (T-RAM) or zero-capacitor RAM (Z-RAM). Types of non-volatile memory may include byte or block addressable types of non-volatile memory. The byte or block addressable types of non-volatile memory may include, but are not limited to, 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

The illustrative rack 1202 includes a connector bank 1222 that is communicatively coupled to the memory sled 1204M. In the illustrative embodiment, at least a portion of the connector bank 1222 is vertically arranged between the sets 1204C-1, 1204C-2 of compute sleds 1204. The connector bank 1222 includes one set of connectors 1222-1 and another set of connectors 1222-2. Each of the set of connectors 1222-1 illustratively includes, or is otherwise embodied as, any connector capable of mating with a corresponding feature (not shown) of a corresponding electromagnetic waveguide 1206. Similarly, each of the set of connectors 1222-2 illustratively includes, or is otherwise embodied as, any connector capable of mating with a corresponding feature (not shown) of a corresponding electromagnetic waveguide 1206.

In the illustrative embodiment, the set of connectors 1222-1 of the connector bank 1222 includes eight connectors 1222-1A, 1222-1B, 1222-1C, 1222-1D, 1222-1E, 1222-1F, 1222-1G, 1222-1H, as shown in FIG. 12. The connector 1222-1A is configured to mate with a corresponding feature of the electromagnetic waveguide 1206-1A to communicatively couple the waveguide 1206-1A to the memory sled 1204M, the connector 1222-1B is configured to mate with a corresponding feature of the electromagnetic waveguide 1206-1B to communicatively couple the waveguide 1206-1B to the memory sled 1204M, and so on for connectors 1222-1C to 1222-1H. Corresponding features of the electromagnetic waveguides 1206-1A to 1206-1H are configured to mate with corresponding connectors (not shown) of the compute sleds 1204C-1A to 1204C-1H so that the compute sleds 1204C-1A to 1204C-1H are communicatively coupled to the memory sled 1204M by the waveguides 1206-1A to 1206-1H. Accordingly, in use of the rack 1202, the waveguides 1206-1A to 1206-1H communicate millimeter wave data signals between the compute sleds 1204C-1A to 1204C-1H and the memory sled 1204M. In the illustrative embodiment, the set of connectors 1222-2 of the connector bank 1222 includes eight connectors 1222-2A, 1222-2B, 1222-2C, 1222-2D, 1222-2E, 1222-2F, 1222-2G, 1222-2H, as shown in FIG. 12, and are configured in a similar manner as connectors 1222-1, which will not be repeated in the interest of clarity.

The illustrative rack 1202 includes a conduit 1224 that extends vertically between a lowermost sled (i.e., the compute sled 1204C-1A) of the set of compute sleds 1204C-1 and an uppermost sled (i.e., the compute sled 1204C-1H) of the set of compute sleds 1204C-1, as shown in FIG. 12. The conduit 1224 is coupled to a central spine 1226 of the rack 1202 that extends vertically. The conduit 1224 illustratively includes, or is otherwise embodied as, any structure capable of routing therethrough the electromagnetic waveguides 1206-1A, 1206-1B, 1206-1C, 1206-1D, 1206-1E, 1206-1F, 1206-1G, 1206-1H. The conduit 1224 may be provided to minimize disruptions caused by the electromagnetic waveguides 1206-1A, 1206-1B, 1206-1C, 1206-1D, 1206-1E, 1206-1F, 1206-1G, 1206-1H to airflow over the compute sleds 1204C-1A, 1204C-1B, 1204C-1C, 1204C-1D, 1204C-1E, 1204C-1F, 1204C-1G, 1204C-1H during operation of the rack 1202.

The illustrative rack 1202 includes a conduit 1228 that extends vertically between a lowermost sled (i.e., the compute sled 1204C-2A) of the set of compute sleds 1204C-2 and an uppermost sled (i.e., the compute sled 1204C-2H) of the set of compute sleds 1204C-2, as shown in FIG. 12. The conduit 1228 is coupled to the central spine 1226. The conduit 1228 illustratively includes, or is otherwise embodied as, any structure capable of routing therethrough the electromagnetic waveguides 1206-2A, 1206-2B, 1206-2C, 1206-2D, 1206-2E, 1206-2F, 1206-2G, 1206-2H. The conduit 1228 may be provided to minimize disruptions caused by the electromagnetic waveguides 1206-2A, 1206-2B, 1206-2C, 1206-2D, 1206-2E, 1206-2F, 1206-2G, 1206-2H to airflow over the compute sleds 1204C-2A, 1204C-2B, 1204C-2C, 1204C-2D, 1204C-2E, 1204C-2F, 1204C-2G, 1204C-2H during operation of the rack 1202.

In some embodiments, each compute sled 1204C of the set of compute sleds 1204C-1 may be inserted through a side 1230 of the rack 1202 toward the central spine 1226 as indicated by arrow 1232. When advanced in the direction indicated by arrow 1232, the connector of each compute sled 1204C of the set of compute sleds 1204C-1 may be configured to blindly mate with the corresponding feature of the corresponding electromagnetic waveguide 1206-1A, 1206-1B, 1206-1C, 1206-1D, 1206-1E, 1206-1F, 1206-1G, 1206-1H. Similarly, in such embodiments, each compute sled 1204C of the set of compute sleds 1204C-2 may be inserted through the side 1230 toward the central spine 1226 in the direction indicated by arrow 1232. When advanced in the direction indicated by arrow 1232, the connector of each compute sled 1204C of the set of compute sleds 1204C-2 may be configured to blindly mate with the corresponding feature of the corresponding electromagnetic waveguide 1206-2A, 1206-2B, 1206-2C, 1206-2D, 1206-2E, 1206-2F, 1206-2G, 1206-2H.

In some embodiments, the rack 1202 may include more than one memory sled 1204M. For example, in one embodiment, some or all of the compute sleds 1204C may have two processors and each compute sled 1204C is connected to each of two memory sleds 1204M through a connector bank 1222 in a similar manner as described above. In such an embodiment, a first processor of each compute sled 1204C may be configured to primarily or exclusively communicate with a first memory sled 1204M and a second processor of each compute sled 1204C may be configured to primarily or exclusively communicate with a second memory sled 1204M. In another example, a rack 1202 may include two memory sleds 1204M, each of which is connected to half of the compute sleds 1204C. In such an embodiment, a first memory sled 1204M may be positioned in the middle of the top half of the rack 1202 and connected to the compute sleds 1204C in the top half of the rack 1202, and a second memory sled 1204M may be positioned in the middle of the bottom half of the rack 1202 and connected to the compute sleds 1204C in the bottom half of the rack 1202.

Figure 13:
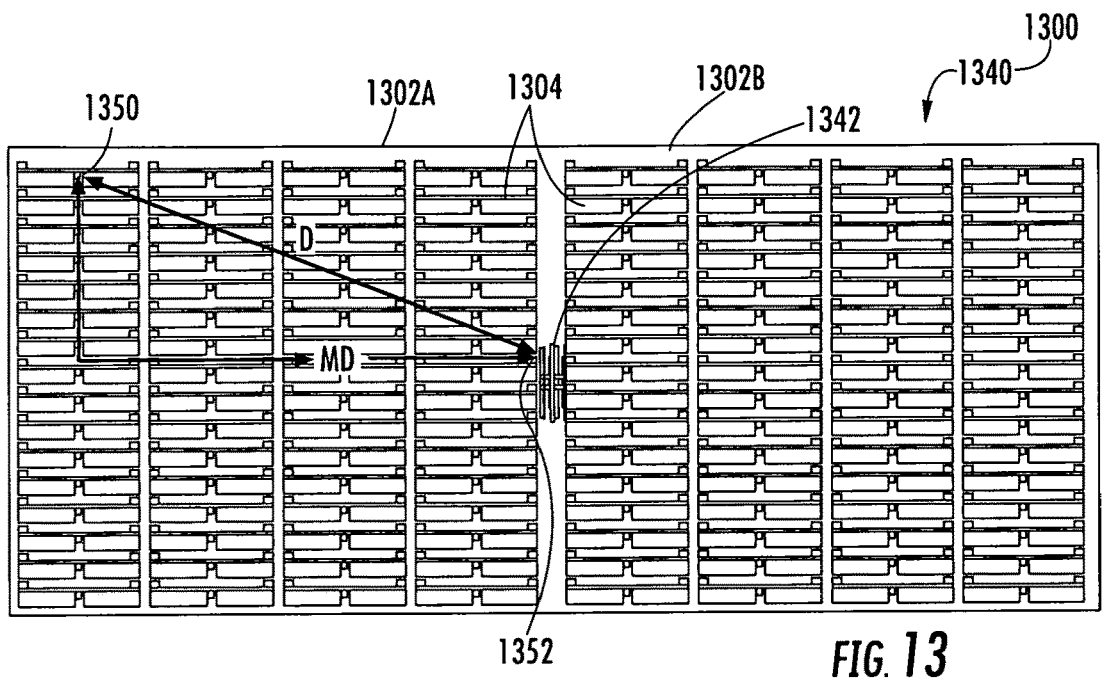
FIG. 13 is a front elevation view of at least one embodiment of a rack pod of the data center of FIGS. 1, 3, and 4 with a switch arranged between a first rack and a second rack.
Figure 14:
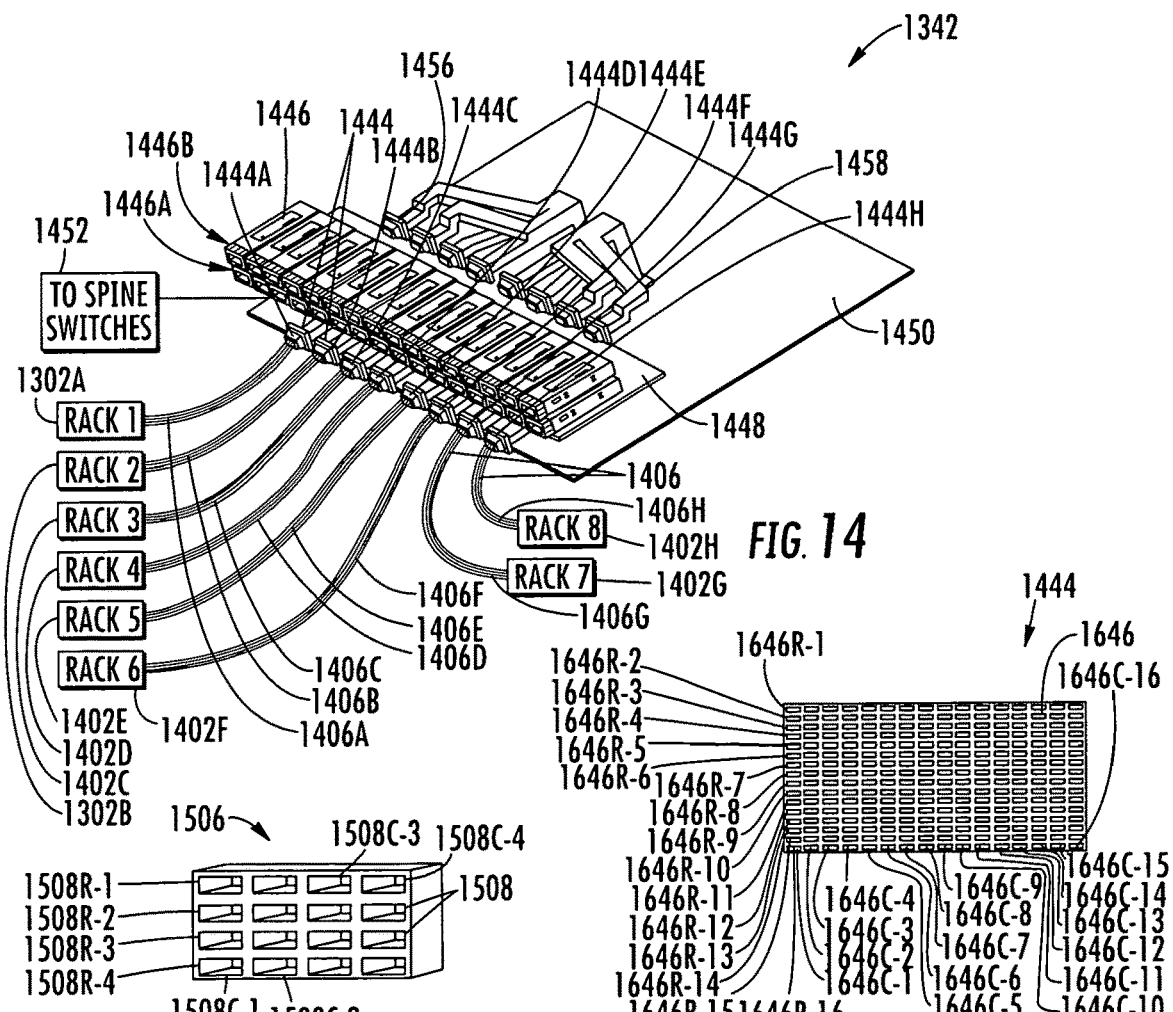
FIG. 14 is a perspective view of the switch shown in FIG. 13.

Referring now to FIGS. 13 and 14, multiple racks 1302A, 1302B may be coupled, mounted, or otherwise situated together to form a rack pod 1340. The rack pod 1340 may be included in a data center 1300, which may be substantially similar to the data center 1200. Like the rack 1202, each of the racks 1302A, 1302B is configured to house or otherwise receive one or more sleds 1304 for mounting therein. The racks 1302A, 1302B may therefore be substantially similar to the rack 1202. In addition, each of the sleds 1304 may be substantially similar to one of the compute sleds 1204C or the memory sled 1204M. Of course, it should be appreciated that the concepts described in regard to FIGS. 13 and 14 may be implemented without necessarily implementing the concepts described above in regard to FIG. 12.

The rack pod 1340 illustratively includes electromagnetic waveguides 1406 as shown in FIG. 14. Each of the illustrative electromagnetic waveguides 1406 extends between a corresponding one of the sleds 1304 and a switch 1342 that is arranged between the racks 1302A, 1302B to communicatively couple the corresponding sled 1304 to the switch 1342. Compared to other configurations, the use of the waveguides 1406 to communicatively couple the sleds 1304 to the switch 1342 may provide one or more benefits. For example, in some configurations, the distance between one or more of the sleds 1304 and the switch 1342 may be such that coupling those components to one another by a conventional electrical cable or a printed circuit board is impractical or otherwise undesirable, as shown in FIG. 13. In such configurations, use of the electromagnetic waveguides 1406 may be desirable. In other configurations, coupling the sleds 1304 to the switch 1342 by conventional electrical cables or printed circuit boards may limit the amount of data communicated between the sleds 1304 and the switch 1342 over a given time period. In those configurations, use of the electromagnetic waveguides 1406 may be preferable. Furthermore, use of the electromagnetic waveguides 1406 may facilitate, or otherwise be associated with, the use of a switch (i.e., the switch 1342) having a higher radix than a switch communicatively coupled to the sleds 1304 by conventional electrical cables or printed circuit boards. Of course, it should be appreciated that the switch 1342 could be in a different position than what is shown in FIG. 13 such that the distance between one or more of the sleds 1304 and the switch 1342 may be different. For example, the switch 1342 could be located at any vertical position between racks, it could be at the top of one of the racks (such as the center-most racks), or it could be straddling two racks (such as the two center-most racks).

The illustrative electromagnetic waveguides 1406 are substantially similar to the waveguides 1206. As such, each of the electromagnetic waveguides 1406 illustratively includes, or is otherwise embodied as, a structure capable of carrying millimeter wave data signals between a corresponding sled 1304 and the switch 1342. Like each electromagnetic waveguide 1206, each electromagnetic waveguide 1406 is illustratively configured to communicate the millimeter wave data signals between the corresponding sled 1304 and the switch 1342 at about 50 to 100 gigabits per second during operation of the rack pod 1340. In the illustrative embodiment, the millimeter wave data signals have a carrier frequency range of about 60 to 120 gigahertz. Furthermore, like each electromagnetic waveguide 1206, each electromagnetic waveguide 1406 includes a core 1408 that is formed from a dielectric material and a metallic coating 1410 that is applied to the core 1408.

In the illustrative embodiment, at least one sled 1304 of each of the racks 1302A, 1302B is communicatively coupled to the switch 1342 by a corresponding electromagnetic waveguide 1406. To mate with corresponding features 1506 (see FIG. 15) of the waveguides 1406 such that the waveguides 1406 are communicatively coupled to the switch 1342, the switch 1342 includes waveguide connectors 1444 that are communicatively coupled to a switch chip 1458. In the illustrative embodiment, the number of waveguide connectors 1444 corresponds to the number of racks 1302 included in the rack pod 1340. That is, each waveguide connector 1444 is configured to mate with corresponding features of one or more electromagnetic waveguides 1406 that are communicatively coupled to one or more sleds 1304 mounted in a corresponding rack 1302. In addition to the racks 1302A, 1302B, the illustrative rack pod 1340 includes racks 1402C, 1402D, 1402E, 1402F, 1402G, 1402H, as best seen in FIG. 14. The illustrative waveguide connectors 1444 therefore include eight connectors 1444A, 1444B, 1444C, 1444D, 1444E, 1444F, 1444G, 1444H to mate with the corresponding features of respective electromagnetic waveguides 1406A, 1406B, 1406C, 1406D, 1406E, 1406F, 1406G, 1406H that are communicatively coupled to respective racks 1302A, 1302B, 1402C, 1402D, 1402E, 1402F, 1402G, 1402H. In the illustrative embodiment, each of the electromagnetic waveguides 1406A, 1406B, 1406C, 1406D, 1406E, 1406F, 1406G, 1406H includes sixteen separate waveguides.

Each electromagnetic waveguide 1406 is coupled to a corresponding sled 1304 at a sled coupling point 1350, as shown in FIG. 13. Each electromagnetic waveguide 1406 is also coupled to the switch 1342 at a switch coupling point 1352. In the illustrative embodiment, the Manhattan Distance MD between the sled coupling point 1350 and the switch coupling point 1352 is no greater than about 10 feet. Additionally, in the illustrative embodiment, the shortest distance D between the sled coupling point 1350 and the switch coupling point 1352 is no greater than about 7.6 feet. Each electromagnetic waveguide 1406 illustratively extends at least 7 feet between the sled coupling point 1350 and the switch coupling point 1352.

The illustrative switch 1342 includes optical connectors 1446 that are supported on a surface 1448 of the switch 1342, as shown in FIG. 14. The optical connectors 1446 are arranged above the waveguide connectors 1444 relative to a surface 1450 of the switch 1342. The optical connectors 1446 illustratively include, or is otherwise embodied as, any connectors capable of mating with corresponding connectors (not shown) of spine switches 1452 included in the rack pod 1340 to communicatively couple the switch 1342 to the spine switches 1452. In some embodiments, the optical connectors 1446 may include, or otherwise by embodied as, quad small form-factor pluggable (QSFP) connectors, each of which may be capable of communicating 400 gigabits of data per second. The spine switches 1452 may be included in a dual-mode optical switching infrastructure, such as the dual-mode optical switching infrastructure 514, for example. Accordingly, the spine switches 1452 may include, or otherwise be embodied as, dual-mode optical switches similar to the dual-mode optical switches 515, multi-ply switches, dual-mode optical spine switches similar to the dual-mode optical spine switches 520, or leaf switches similar to the leaf switches 530.

In the illustrative embodiment, the optical connectors 1446 include one set of optical connectors 1446A and another set of optical connectors 1446B. The set of optical connectors 1446A is arranged below the set of optical connectors 1446B relative to the surface 1448. Each set of optical connectors 1446A, 1446B includes 16 optical connectors. Of course, it should be appreciated that in other embodiments, each set of optical connectors 1446A, 1446B may include another suitable number of optical connectors. Additionally, in other embodiments, the number of optical connectors included in the set 1446A may be different from the number of optical connectors included in the set 1446B.

The illustrative switch 1342 includes chip connectors 1456 that are communicatively coupled to the switch chip 1458 mounted on the surface 1450. The chip connectors 1456 illustratively include, or are otherwise embodied as, any connectors capable of interfacing with the optical connectors 1446 to communicatively couple the optical connectors 1446 to the switch chip 1458. The chip connectors 1456 include eight connectors. However, in other embodiments, the chip connectors 1456 may include another suitable number of connectors. The switch chip 1458 provides signal connectivity between the waveguide connectors 1444 and the optical connectors 1446. The chip switch 1458 is illustratively configured to process 25.6 terabits of data per second.

In the illustrative embodiment, the waveguide connectors 1444A, 1444B, 1444C, 1444D, 1444E, 1444F, 1444G, 1444H of the switch 1342 may be blindly mated with the connectors 1506 of the respective electromagnetic waveguides 1406A, 1406B, 1406C, 1406D, 1406E, 1406F, 1406G, 1406H to communicatively couple the waveguide connectors 1444A, 1444B, 1444C, 1444D, 1444E, 1444F, 1444G, 1444H to the waveguides 1406A, 1406B, 1406C, 1406D, 1406E, 1406F, 1406G, 1406H. Additionally, in the illustrative embodiment, the optical connectors 1446 may be blindly mated with the corresponding connectors of the spine switches 1452 to communicatively couple the optical connectors 1446 to the corresponding connectors of the spine switches 1452.

Figure 15:
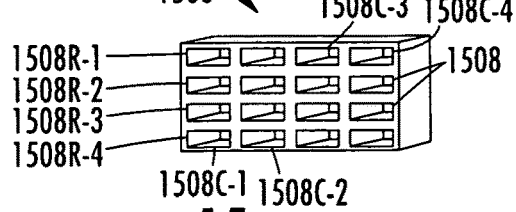
FIG. 15 is a perspective view of a connector of an electromagnetic waveguide that is configured to mate with a corresponding waveguide connector of the switch of FIG. 14.

Referring now to FIG. 15, an illustrative connector 1506 may include several connector ports 1508, with each connector port 1508 corresponding to one of the waveguides 1406. In such a configuration, a connector port 1508 may be capable of communicating 50 to 100 gigabits of data per second, with an aggregate connectivity of, e.g., 800 to 1,600 gigabits of data per second for the connector 1506. It should be appreciated that each of the illustrative waveguides 1406 includes a pair of connectors 1506, one of which is configured to mate with a corresponding sled 1304 and the other of which is configured to mate with a corresponding waveguide connector 1444. In some embodiments, a connector 1506 with a large number of connector port 1508 may connect to several connectors 1506 with a fewer number of connector ports 1508. For example, a connector 1506 connected to the switch 1342 may have enough ports 1508 to carry 1.6 terabits per second, and that connector 1506 may be connected by electromagnetic waveguides 1406 to each of the 16 sleds on a single rack, with a connector 1506 with enough connector ports 1508 to carry 400 gigabits per second. Additionally, it should be appreciated that the illustrative connector 1506 may be included in, or otherwise embodied as, a connector of one or more of the electromagnetic waveguides 1206 (discussed above) or the electromagnetic waveguides 2006 (discussed below). The illustrative connector ports 1508 include four rows 1508R-1, 1508R-2, 1508R-3, 1508R-4 of connector ports 1508. Additionally, the illustrative connector ports 1508 include four columns 1508C-1, 1508C-2, 1508C-3, 1508C-4 of connector ports 1508. However, in other embodiments, the connector ports 1508 may include another suitable number of rows and columns.

Figure 16:
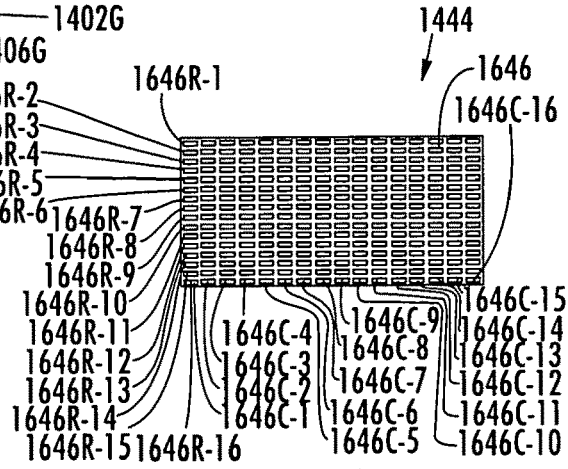
FIG. 16 is a front elevation view of a waveguide connector of the switch of FIG. 14.

Referring now to FIG. 16, an illustrative waveguide connector 1444 of the switch 1342 is configured to mate with the connectors 1506 of the electromagnetic waveguides 1406 that are communicatively coupled to the sleds 1304 mounted in one of the racks 1302A, 1302B, 1402C, 1402D, 1402E, 1402F, 1402G, 1402H. Using the rack 1302A as an example, which includes at least sixteen sleds 1304A, the waveguide connector 1444A is configured to mate with the connectors 1506 of the at least sixteen electromagnetic waveguides 1406A that are each communicatively coupled to one of the at least sixteen sleds 1304A. Accordingly, the waveguide connector 1444 includes waveguide connector ports 1646 that have at least sixteen rows 1646R-1, 1646R-2, 1646R-3, 1646R-4, 1646R-5, 1646R-6, 1646R-7, 1646R-8, 1646R-9, 1646R-10, 1646R-11, 1646R-12, 1646R-13, 1646R-14, 1646R-15, 1646R-16 of connector ports 1646. Additionally, the waveguide connector ports 1646 have at least sixteen columns 1646C-1, 1646C-2, 1646C-3, 1646C-4, 1646C-5, 1646C-6, 1646C-7, 1646C-8, 1646C-9, 1646C-10, 1646C-11, 1646C-12, 1646C-13, 1646C-14, 1646C-15, 1646C-16. However, in other embodiments, the connector ports 1646 may include another suitable number of rows and columns. In any case, each of the illustrative connector ports 1646 is capable of communicating 50 to 100 gigabytes of data.

Again, using the rack 1302A as an example, when the connectors 1506 of the at least sixteen electromagnetic waveguides 1406A are mated with the at least sixteen sleds 1304A and with the waveguide connector 1444A, the waveguide connector 1444A is communicatively coupled to the at least sixteen sleds 1304A. Because the switch 1342 includes the eight waveguide connectors 1444A, 1444B, 1444C, 1444D, 1444E, 1444F, 1444G, 1444H, the switch 1342 is connected to at least 128 of the sleds 1304 in use of the rack pod 1340. The switch 1342 therefore illustratively includes, or is otherwise embodied as, a high-radix switch. The switch 1342 also may be said to have a radix of 128.

Figure 17:
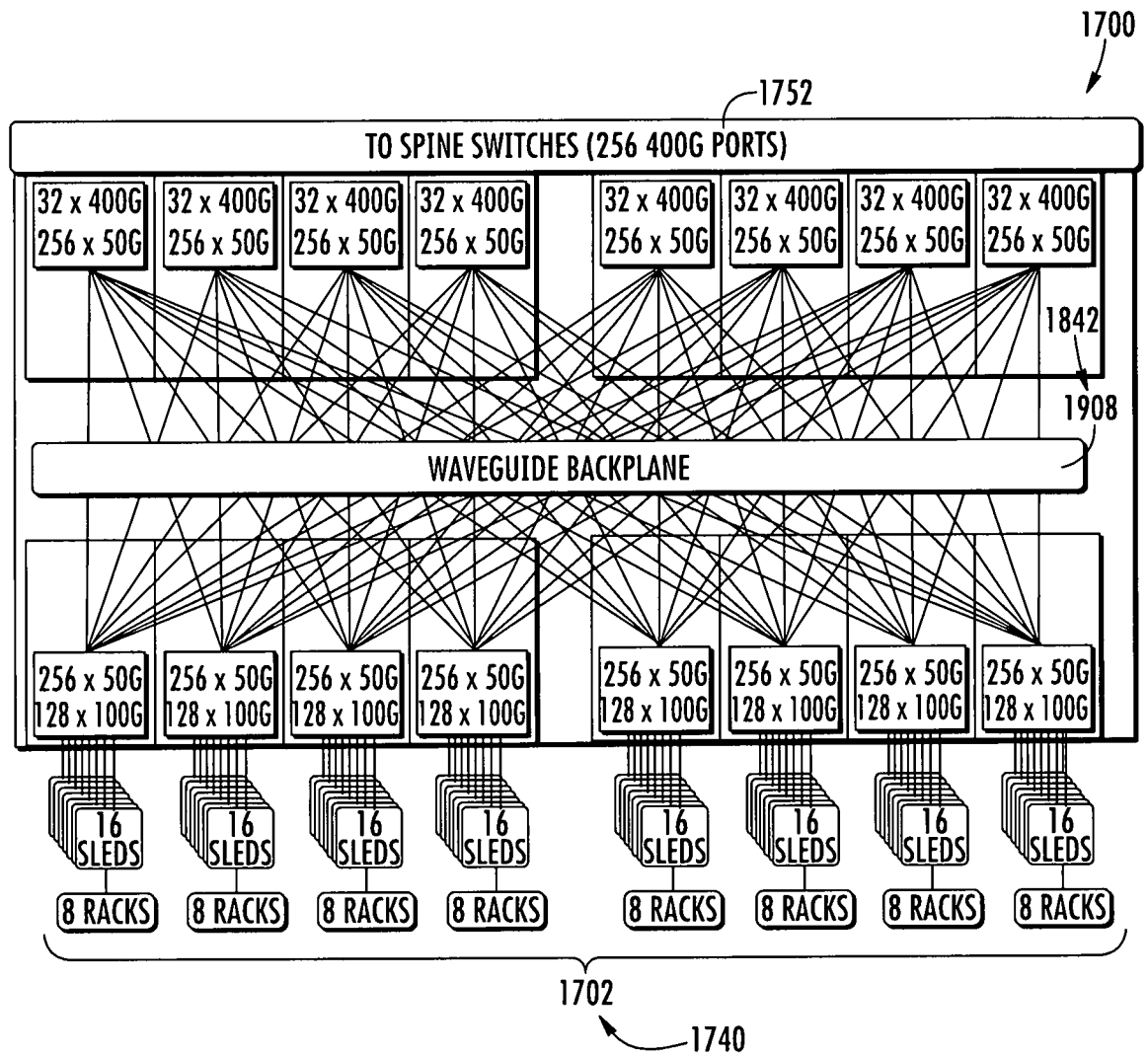
FIG. 17 is a diagram of a connectivity scheme that may be established among various sleds of the data centers of FIGS. 1, 3, 4, 12, and 13.

Referring now to FIG. 17, a connectivity scheme 1700 that may generally be representative of link-layer connectivity may be established in some embodiments among various racks 1702 of a rack pod 1740, which may be included in a data center such as any of example data centers 100, 300, 400, 1200, and 1300 of respective FIGS. 1, 3, 4, 12, and 13, for instance. The connectivity scheme 1700 may be connected to or otherwise form a part of an optical fabric that features a dual-mode optical switching infrastructure, such as the dual-mode optical switching infrastructure 514. The connectivity scheme 1700 may incorporate, or otherwise be implemented with the use of, at least one pod switch 1842 (see FIG. 18). As described in greater detail below, in use of the rack pod 1740, the at least one pod switch 1842 is communicatively coupled to the racks 1702 and to spine switches 1752 included in the rack pod 1740. Additionally, as further discussed below, electromagnetic waveguides 2006 (see FIG. 20) arranged on a waveguide backplane 1908 (see FIG. 19) of the at least one pod switch 1842 communicatively couple the racks 1702 to the spine switches 1752 through the at least one pod switch 1842 in use of the rack pod 1740.

In the illustrative embodiment, each of the racks 1702 is configured to house or otherwise receive one or more sleds 1704 for mounting therein. The racks 1702 are therefore substantially similar to the racks 1202, 1302A, 1302B. In addition, each of the sleds 1704 is substantially similar to one of the sleds 1304 and to one of the compute sleds 1204C or the memory sled 1204M. In some embodiments, the racks 1702 may include 64 racks. In those embodiments, each of the 64 racks may include 16 sleds of the sleds 1704. Thus, in those embodiments, the sleds 1704 may include 1024 sleds.

Compared to other configurations, the use of the electromagnetic waveguides 2006 to communicatively couple the racks 1702 to the spine switches 1752 through the pod switch 1842 may provide one or more benefits. For example, in some configurations, communicatively coupling the racks 1702 to the spine switches 1752 by conventional electrical cables or printed circuit boards may be impractical or otherwise undesirable from the standpoint of supplying power and/or transferring data at particular bandwidths between the racks 1702 and the spine switches 1752. In such configurations, use of the electromagnetic waveguides 2006 may be desirable. In other configurations, communicatively coupling the racks 1702 to the spine switches 1752 by conventional electrical cables or printed circuit boards may be associated with undesirable cost. In those configurations, use of the electromagnetic waveguides 2006 may be preferable.

Figure 18:
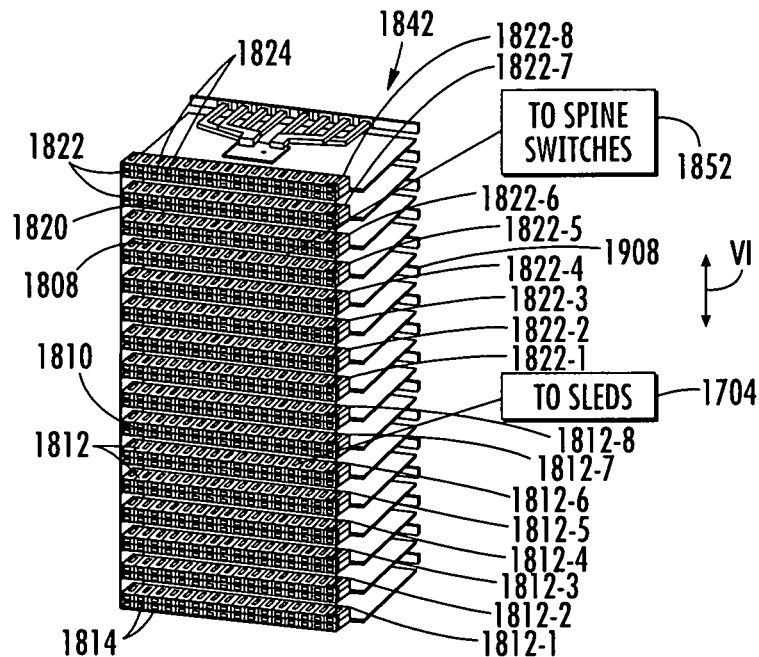
FIG. 18 is a front perspective view of a pod switch that may be included in the data centers of FIGS. 1, 3, 4, 12, and 13.

Referring now to FIG. 18, a front panel or front side 1808 of the pod switch 1842 that is arranged opposite the waveguide backplane or back side 1908 illustratively includes a rack interface 1810 and a spine switch interface 1820. The illustrative rack interface 1810 includes, or is otherwise embodied as, a set of line cards 1812 having optical connectors 1814. The optical connectors 1814 include, or are otherwise embodied as, any connectors capable of mating with corresponding connectors (not shown) of the spine switches 1852 to communicatively couple the pod switch 1842 to the spine switches 1852. The spine switch interface 1820 includes, or is otherwise embodied as, a set of line cards 1822 having optical connectors 1824. The optical connectors 1824 include, or are otherwise embodied as, any connectors capable of mating with corresponding connectors (not shown) of the sleds 1704 to communicatively couple the pod switch 1842 to the sleds 1704. As discussed below, in use of the rack pod 1740, each one of the electromagnetic waveguides 2006 communicatively couples at least one of the line cards included in the set 1812 to at least one of the line cards included in the set 1822 to communicate millimeter wave data signals between the at least one line card of the set 1812 and the at least one line card of the set 1822.

In the illustrative embodiment, the set of line cards 1822 is arranged above the set of line cards 1812 relative to a support surface (not shown) on which the pod switch 1842 rests. Of course, it should be appreciated that in other embodiments, the sets of line cards 1812, 1822 may have another suitable arrangement relative to one another. In any case, the set of line cards 1812 illustratively includes eight line cards 1812-1, 1812-2, 1812-3, 1812-4, 1812-5, 1812-6, 1812-7, 1812-8 that are spaced from one another in a vertical direction indicated by arrow V1. Similarly, the set of line cards 1822 illustratively includes eight line cards 1822-1, 1822-2, 1822-3, 1822-4, 1822-5, 1822-6, 1822-7, 1822-8 that are vertically spaced from one another. However, in other embodiments, each of the sets of line cards 1812, 1822 may include another suitable number of line cards. Additionally, in other embodiments, the number of line cards included in the set 1812 may be different from the number of line cards included in the set 1822.

Each of the illustrative line cards 1812-1, 1812-2, 1812-3, 1812-4, 1812-5, 1812-6, 1812-7, 1812-8 includes 32 of the optical connectors 1814, as shown in FIG. 18. In some embodiments, the optical connectors 1814 may include, or otherwise by embodied as, quad small form-factor pluggable connectors, each of which may be capable of communicating between 50 to 400 gigabits of data per second. Of course, it should be appreciated that in other embodiments, each of the illustrative line cards 1812-1, 1812-2, 1812-3, 1812-4, 1812-5, 1812-6, 1812-7, 1812-8 may include another suitable number of the optical connectors 1814.

Each of the illustrative line cards 1822-1, 1822-2, 1822-3, 1822-4, 1822-5, 1822-6, 1822-7, 1822-8 includes 32 of the optical connectors 1824, as shown in FIG. 18. In some embodiments, the optical connectors 1824 may include, or otherwise by embodied as, quad small form-factor pluggable connectors, each of which may be capable of communicating between 50 to 400 gigabits of data per second. Of course, it should be appreciated that in other embodiments, each of the illustrative line cards 1822-1, 1822-2, 1822-3, 1822-4, 1822-5, 1822-6, 1822-7, 1822-8 may include another suitable number of the optical connectors 1824.

Figure 19:
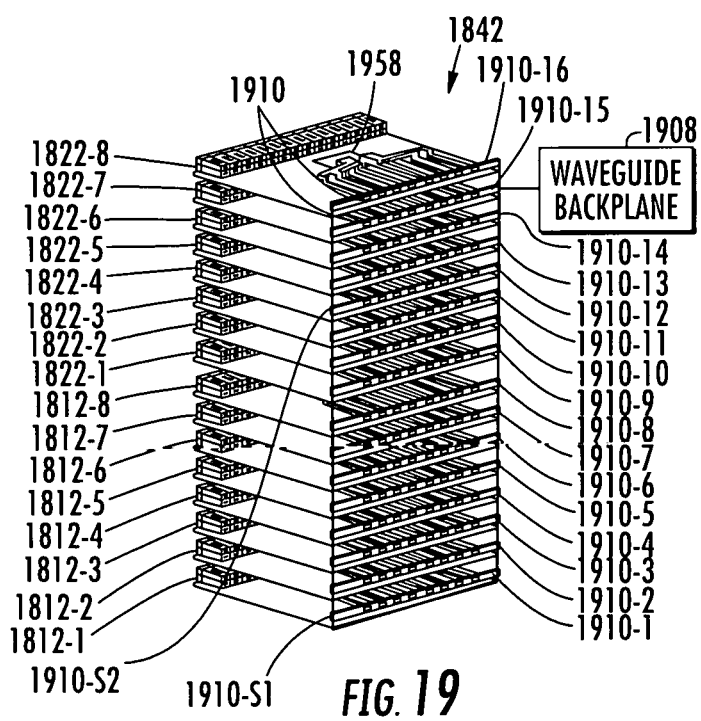
FIG. 19 is a rear perspective view of the pod switch of FIG. 18.

Referring now to FIG. 19, the waveguide backplane 1908 illustratively includes, or is otherwise embodied as, waveguide connectors 1910 that are spaced from one another in a vertical direction as indicated by arrow V2. More specifically, the waveguide backplane 1908 includes 16 waveguide connector rows 1910-1, 1910-2, 1910-3, 1910-4, 1910-5, 1910-6, 1910-7, 1910-8, 1910-9, 1910-10, 1910-11, 1910-12, 1910-13, 1910-14, 1910-15, 1910-16 that are vertically spaced from one another. In the illustrative embodiment, each of the waveguide connector rows 1910-1, 1910-2, 1910-3, 1910-4, 1910-5, 1910-6, 1910-7, 1910-8, 1910-9, 1910-10, 1910-11, 1910-12, 1910-13, 1910-14, 1910-15, 1910-16 includes, or is otherwise embodied as, eight waveguide connectors 1910. Of course, it should be appreciated that in other embodiments, the waveguide backplane 1908 may include another suitable number of waveguide connector rows. Additionally, in other embodiments, each waveguide connector row may include another suitable number of waveguide connectors.

In the illustrative embodiment, the waveguide connector rows 1910-1, 1910-2, 1910-3, 1910-4, 1910-5, 1910-6, 1910-7, 1910-8 are included in, or otherwise coupled to, the line cards 1812-1, 1812-2, 1812-3, 1812-4, 1812-5, 1812-6, 1812-7, 1812-8. Additionally, in the illustrative embodiment, the waveguide connector rows 1910-9, 1910-10, 1910-11, 1910-12, 1910-13, 1910-14, 1910-15, 1910-16 are included in, or otherwise coupled to, the line cards 1822-1, 1822-2, 1822-3, 1822-4, 1822-5, 1822-6, 1822-7, 1822-8. Each of the illustrative line cards 1812-1, 1812-2, 1812-3, 1812-4, 1812-5, 1812-6, 1812-7, 1812-8, 1822-1, 1822-2, 1822-3, 1822-4, 1822-5, 1822-6, 1822-7, 1822-8 may a switch chip 1958. The switch chip 1958 is illustratively configured to process 25.6 terabits of data per second.

Each of the illustrative waveguide connectors 1910 includes, or is otherwise embodied as, any connector capable of mating with a corresponding connector (not shown) of one of the electromagnetic waveguides 2006 to communicatively couple the waveguide connector 1910 to a corresponding electromagnetic waveguide 2006. The waveguide connector rows 1910-1, 1910-2, 1910-3, 1910-4, 1910-5, 1910-6, 1910-7, 1910-8 are included in, or otherwise correspond to, a set of waveguide connector rows 1910-S1. The waveguide connector rows 1910-9, 1910-10, 1910-11, 1910-12, 1910-13, 1910-14, 1910-15, 1910-16 are included in, or otherwise correspond to, a set of waveguide connector rows 1910-S2. The set of waveguide connector rows 1910-S2 is arranged vertically above the set of waveguide connector rows 1910-S1 relative to the support surface on which the pod switch 1842 rests.

Figure 20:
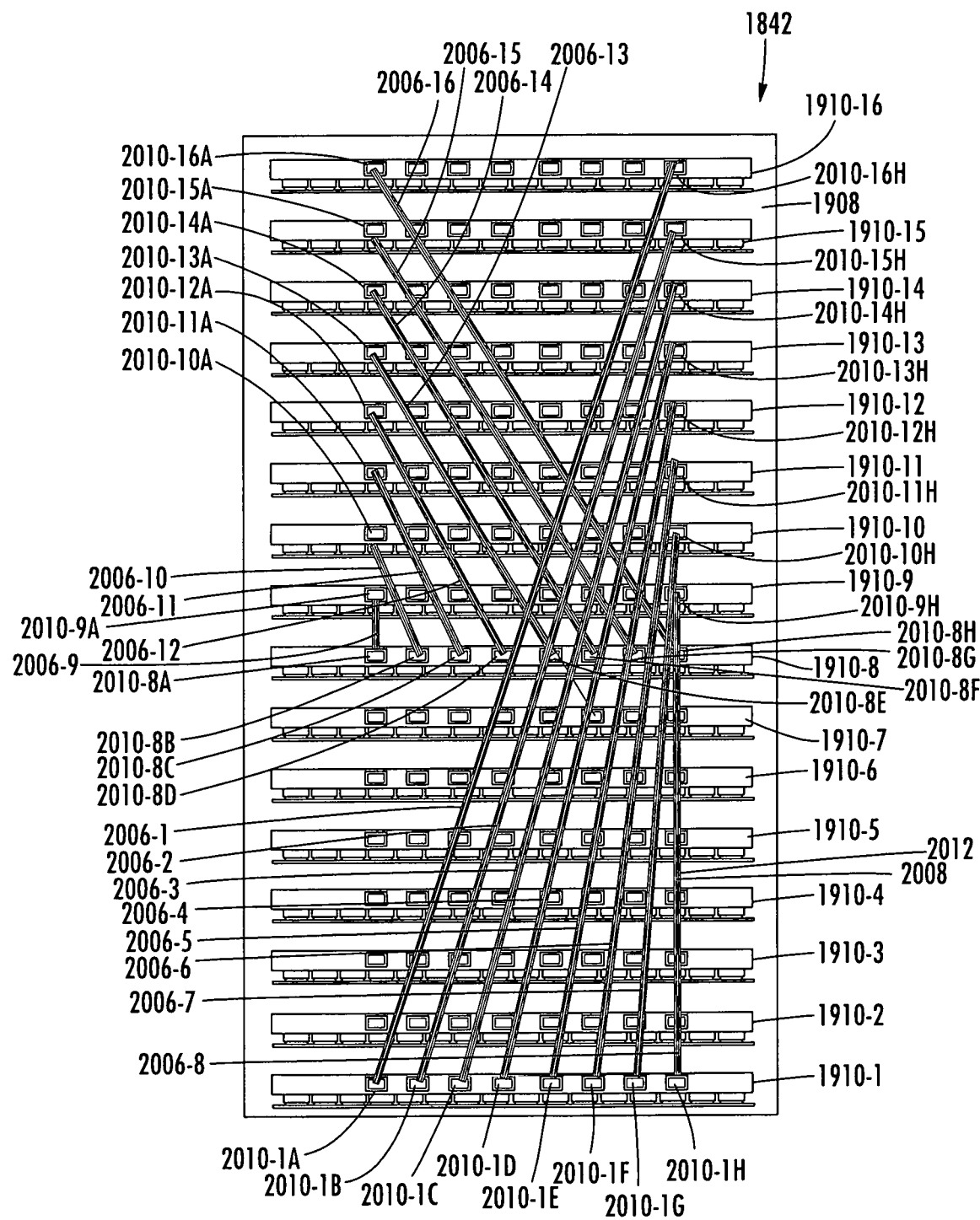
FIG. 20 is a partial elevation view of the pod switch of FIG. 19 with a first set of line cards communicatively coupled to a second set of line cards by electromagnetic waveguides.

Referring now to FIG. 20, the waveguide connector row 1910-1 illustratively includes waveguide connectors 2010-1A, 2010-1B, 2010-1C, 2010-1D, 2010-1E, 2010-1F, 2010-1G, 2010-1H. The waveguide connector rows 1910-9, 1910-10, 1910-11, 1910-12, 1910-13, 1910-14, 1910-15, 1910-16 illustratively include respective waveguide connectors 2010-9H, 2010-10H, 2010-11H, 2010-12H, 2010-13H, 2010-14H, 2010-15H, 2010-16H. In the illustrative embodiment, the waveguide connectors 2010-1A, 2010-1B, 2010-1C, 2010-1D, 2010-1E, 2010-1F, 2010-1G, 2010-1H are communicatively coupled to the respective waveguide connectors 2010-16H, 2010-15H, 2010-14H, 2010-13H, 2010-12H, 2010-11H, 2010-10H, 2010-9H by respective electromagnetic waveguides 2006-1, 2006-2, 2006-3, 2006-4, 2006-5, 2006-6, 2006-7, 2006-8.

The waveguide connector row 1910-8 illustratively includes waveguide connectors 2010-8A, 2010-8B, 2010-8C, 2010-8D, 2010-8E, 2010-8F, 2010-8G, 2010-8H. The waveguide connector rows 1910-9, 1910-10, 1910-11, 1910-12, 1910-13, 1910-14, 1910-15, 1910-16 illustratively include respective waveguide connectors 2010-9A, 2010-10A, 2010-11A, 2010-12A, 2010-13A, 2010-14A, 2010-15A, 2010-16A. In the illustrative embodiment, the waveguide connectors 2010-8A, 2010-8B, 2010-8C, 2010-8D, 2010-8E, 2010-8F, 2010-8G, 2010-8H are communicatively coupled to the respective waveguide connectors 2010-9A, 2010-10A, 2010-11A, 2010-12A, 2010-13A, 2010-14A, 2010-15A, 2010-16A by respective electromagnetic waveguides 2006-9, 2006-10, 2006-11, 2006-12, 2006-13, 2006-14, 2006-15, 2006-16.

The illustrative electromagnetic waveguides 2006 are substantially similar to the waveguides 1206, 1406. As such, each of the electromagnetic waveguides 2006-1, 2006-2, 2006-3, 2006-4, 2006-5, 2006-6, 2006-7, 2006-8, 2006-9, 2006-10, 2006-11, 2006-12, 2006-13, 2006-14, 2006-15, 2006-16 illustratively includes, or is otherwise embodied as, a structure capable of carrying millimeter wave data signals between a corresponding waveguide connector 1910 of the set of waveguide connector rows 1910-S1 and a corresponding waveguide connector 1910 of the set of waveguide connector rows 1910-S2 during operation of the pod switch 1842. Like each electromagnetic waveguide 1206, 1406, each electromagnetic waveguide 2006-1, 2006-2, 2006-3, 2006-4, 2006-5, 2006-6, 2006-7, 2006-8, 2006-9, 2006-10, 2006-11, 2006-12, 2006-13, 2006-14, 2006-15, 2006-16 is illustratively configured to communicate the millimeter wave data signals between the corresponding waveguide connector 1910 of the set of waveguide connector rows 1910-S1 and the corresponding waveguide connector 1910 of the set of waveguide connector rows 1910-S2 at about 50 to 100 gigabits per second during operation of the pod switch 1842. In the illustrative embodiment, the millimeter wave data signals have a frequency range of about 60 to 120 gigahertz. Furthermore, like each electromagnetic waveguide 1206, 1406, each electromagnetic waveguide 2006 includes a core 2008 that is formed from a dielectric material and a metallic coating 2012 that is applied to the core 2008.

EXAMPLES

Illustrative examples of the technologies disclosed herein are provided below. An embodiment of the technologies may include any one or more, and any combination of, the examples described below.

Example 1 includes a rack comprising a plurality of sleds vertically spaced from one another, wherein the plurality of sleds include a memory sled and multiple compute sleds; and a plurality of electromagnetic waveguides to communicate millimeter wave data signals, wherein each electromagnetic waveguide communicatively couples the memory sled to a corresponding one of the multiple compute sleds.

Example 2 includes the subject matter of Example 1, and wherein each electromagnetic waveguide is to communicate the millimeter wave data signals between the memory sled and the corresponding one of the multiple compute sleds at about 50 to 100 gigabits per second.

Example 3 includes the subject matter of any of Examples 1 and 2, and wherein the millimeter wave data signals have a carrier frequency range of about 60 to 120 gigahertz.

Example 4 includes the subject matter of any of Examples 1-3, and wherein each electromagnetic waveguide comprises a core formed from a dielectric material.

Example 5 includes the subject matter of any of Examples 1-4, and wherein each electromagnetic waveguide comprises a metallic coating applied to the core.

Example 6 includes the subject matter of any of Examples 1-5, and wherein the multiple compute sleds comprise a first set of compute sleds and a second set of compute sleds arranged above the first set of compute sleds.

Example 7 includes the subject matter of any of Examples 1-6, and further including a first conduit that extends vertically between a lowermost sled of the first set of compute sleds and an uppermost sled of the first set of compute sleds, wherein the first conduit routes therethrough a first set of electromagnetic waveguides of the plurality of electromagnetic waveguides that communicatively couple the memory sled to the first set of compute sleds to minimize disruptions caused by the first set of electromagnetic waveguides to airflow over the first set of compute sleds during operation of the rack.

Example 8 includes the subject matter of any of Examples 1-7, and further including a second conduit that extends vertically between a lowermost sled of the second set of compute sleds and an uppermost sled of the second set of compute sleds, wherein the second conduit routes therethrough a second set of electromagnetic waveguides of the plurality of electromagnetic waveguides that communicatively couple the memory sled to the second set of compute sleds to minimize disruptions caused by the second set of electromagnetic waveguides to airflow over the second set of compute sleds during operation of the rack.

Example 9 includes the subject matter of any of Examples 1-8, and wherein a portion of the memory sled is arranged vertically between the first set of compute sleds and the second set of compute sleds.

Example 10 includes the subject matter of any of Examples 1-9, and wherein the first and second sets of compute sleds each comprise eight compute sleds.

Example 11 includes the subject matter of any of Examples 1-10, and wherein the plurality of electromagnetic waveguides comprise sixteen electromagnetic waveguides.

Example 12 includes the subject matter of any of Examples 1-11, and further including a connector bank communicatively coupled to the memory sled, wherein the connector bank includes a first set of connectors, and wherein each of the first set of connectors mates with a corresponding feature of a corresponding one of the electromagnetic waveguides to communicatively couple a corresponding one of the first set of compute sleds to the memory sled.

Example 13 includes the subject matter of any of Examples 1-12, and wherein the first set of connectors comprises eight connectors.

Example 14 includes the subject matter of any of Examples 1-13, and wherein the connector bank includes a second set of connectors, and wherein each of the second set of connectors mates with a corresponding feature of a corresponding one of the electromagnetic waveguides to communicatively couple a corresponding one of the second set of compute sleds to the memory sled.

Example 15 includes the subject matter of any of Examples 1-14, and wherein the second set of connectors comprises eight connectors.

Example 16 includes a rack pod comprising a plurality of racks comprising a first rack and a second rack, wherein each rack of the plurality of racks has plurality of sleds; a plurality of electromagnetic waveguides to carry millimeter wave data signals, wherein the plurality of electromagnetic waveguides include a first electromagnetic waveguide communicatively coupled to at least one sled of the plurality of sleds of the first rack and a second electromagnetic waveguide communicatively coupled to at least one sled of the plurality of sleds of the second rack; and a switch arranged between the first rack and the second rack, wherein the switch includes a plurality of waveguide connectors to mate with the plurality of electromagnetic waveguides, and wherein the waveguide connectors include a first waveguide connector to mate with the first electromagnetic waveguide to communicatively couple the first electromagnetic waveguide to the switch and a second waveguide connector to mate with the second electromagnetic waveguide to communicatively couple the second electromagnetic waveguide to the switch.

Example 17 includes the subject matter of Example 16, and wherein each electromagnetic waveguide carries the millimeter wave data signals at about 50 to 100 gigabits per second during operation of the rack pod.

Example 18 includes the subject matter of any of Examples 16 and 17, and wherein the millimeter wave data signals have a carrier frequency range of about 60 to 120 gigahertz.

Example 19 includes the subject matter of any of Examples 16-18, and wherein the plurality of racks comprise eight racks.

Example 20 includes the subject matter of any of Examples 16-19, and wherein the plurality of waveguide connectors of the switch comprises eight waveguide connectors.

Example 21 includes the subject matter of any of Examples 16-20, and wherein each electromagnetic waveguide comprises a core formed from a dielectric material.

Example 22 includes the subject matter of any of Examples 16-21, and wherein each electromagnetic waveguide comprises a metallic coating applied to the core.

Example 23 includes the subject matter of any of Examples 16-22, and wherein the switch comprises a high-radix switch.

Example 24 includes the subject matter of any of Examples 16-23, and wherein the switch is connected to 128 sleds of the plurality of sleds of the plurality of racks.

Example 25 includes the subject matter of any of Examples 16-24, and wherein each electromagnetic waveguide is coupled to at least one sled of the plurality of sleds of the plurality of racks at a sled coupling point and to the switch at a switch coupling point, and wherein the Manhattan distance between the sled coupling point and the switch coupling point is no greater than about 10 feet.

Example 26 includes the subject matter of any of Examples 16-25, and wherein the shortest distance between the sled coupling point and the switch coupling point is no greater than about 7.6 feet.

Example 27 includes the subject matter of any of Examples 16-26, and wherein each electromagnetic waveguide is at least 7 feet long.

Example 28 includes the subject matter of any of Examples 16-27, and wherein (i) each electromagnetic waveguide carries the millimeter wave data signals at about 50 to 100 gigabits per second during operation of the rack pod, (ii) each electromagnetic waveguide is at least 7 feet long, and (iii) the switch has a radix of least 128.

Example 29 includes the subject matter of any of Examples 16-28, and wherein the plurality of waveguide connectors of the switch are blindly mated with the plurality of electromagnetic waveguides.

Example 30 includes the subject matter of any of Examples 16-29, and wherein the switch comprises a plurality of optical connectors to mate with corresponding connectors of spine switches of the rack pod to communicatively couple the switch to the spine switches.

Example 31 includes the subject matter of any of Examples 16-30, and wherein the plurality of optical connectors comprises 32 optical connectors.

Example 32 includes the subject matter of any of Examples 16-31, and wherein the plurality of optical connectors of the switch are blindly mated with the corresponding connectors of the spine switches.

Example 33 includes a pod switch comprising a first set of line cards having optical connectors to mate with corresponding connectors of a plurality of spine switches to communicatively couple the pod switch to the plurality of spine switches; a second set of line cards having optical connectors to mate with corresponding connectors of a plurality of sleds to communicatively couple the pod switch to the plurality of sleds; and a plurality of electromagnetic waveguides, wherein each electromagnetic waveguide communicatively couples at least one line card of the first set of line cards to at least one line card of the second set of line cards to communicate millimeter wave data signals between the at least one line card of the first set of line cards and the at least one line card of the second set of line cards.

Example 34 includes the subject matter of Example 33, and wherein each electromagnetic waveguide carries the millimeter wave data signals at about 50 to 100 gigabits per second during operation of the pod switch.

Example 35 includes the subject matter of any of Examples 33 and 34, and wherein the millimeter wave data signals have a carrier frequency range of about 60 to 120 gigahertz.

Example 36 includes the subject matter of any of Examples 33-35, and wherein the first set of line cards is arranged above the second set of line cards.

Example 37 includes the subject matter of any of Examples 33-36, and wherein the first set of line cards comprises eight line cards that are vertically spaced from one another.

Example 38 includes the subject matter of any of Examples 33-37, and wherein the second set of line cards comprises eight line cards that are vertically spaced from one another.

Example 39 includes the subject matter of any of Examples 33-38, and wherein each line card of the first set of line cards comprises 32 optical connectors.

Example 40 includes the subject matter of any of Examples 33-39, and wherein each line card of the second set of line cards comprises 32 optical connectors.

Example 41 includes the subject matter of any of Examples 33-40, and further including a plurality of waveguide connectors to mate with the plurality of electromagnetic waveguides, wherein the first and second sets of line cards are arranged on a first side of the pod switch and the plurality of waveguide connectors are arranged on a second side of the pod switch arranged opposite the first side.

Example 42 includes the subject matter of any of Examples 33-41, and wherein the plurality of waveguide connectors comprises 16 rows of waveguide connectors that are vertically spaced from one another.

Example 43 includes the subject matter of any of Examples 33-42, and wherein each row of waveguide connectors comprises eight waveguide connectors.

Example 44 includes the subject matter of any of Examples 33-43, and wherein the rows of waveguide connectors comprise a first set of waveguide connector rows and a second set of waveguide connector rows arranged below the first set of waveguide connector rows.

Example 45 includes the subject matter of any of Examples 33-44, and wherein each waveguide connector of one row of the second set of waveguide connector rows is communicatively coupled to one waveguide connector of each row of the first set of waveguide connector rows by a corresponding one of the electromagnetic waveguides.

Example 46 includes the subject matter of any of Examples 33-45, and wherein each waveguide connector of another row of the second set of waveguide connector rows is communicatively coupled to another waveguide connector of each row of the first set of waveguide connector rows by a corresponding one of the electromagnetic waveguides.

Example 47 includes the subject matter of any of Examples 33-46, and wherein each electromagnetic waveguide comprises a core formed from a dielectric material.

Example 48 includes the subject matter of any of Examples 33-47, and wherein each electromagnetic waveguide comprises a metallic coating applied to the core.

What is claimed is:

1. A rack comprising:
a plurality of circuit boards, wherein the plurality of circuit boards include a memory circuit board and multiple compute circuit boards;
a plurality of electromagnetic waveguides to communicate millimeter wave data signals, wherein each electromagnetic waveguide communicatively couples the memory circuit board to a corresponding one of the multiple compute circuit boards and wherein each electromagnetic waveguide includes at least one connector to connect a respective electromagnetic waveguide to a corresponding connector of the memory circuit board or to a corresponding connector of the corresponding one of the multiple compute circuit boards; and
a connector bank communicatively coupled to the memory circuit board, wherein the connector bank includes a first set of connectors, and wherein each of the first set of connectors mates with a corresponding feature of a corresponding one of the electromagnetic waveguides to communicatively couple a corresponding one of the compute circuit boards to the memory circuit board.

2. The rack of claim 1, wherein each electromagnetic waveguide is to communicate the millimeter wave data signals between the memory circuit board and the corresponding one of the multiple compute circuit boards at about 50 to 100 gigabits per second.

3. The rack of claim 2, wherein the millimeter wave data signals have a carrier frequency range of about 60 to 120 gigahertz.

4. The rack of claim 1, wherein the multiple compute circuit boards comprise a first set of compute circuit boards and a second set of compute circuit boards arranged above the first set of compute circuit boards.

5. The rack of claim 4, wherein the memory circuit board is arranged vertically between the first set of compute circuit boards and the second set of compute circuit boards.

6. The rack of claim 5, further comprising:
a second plurality of circuit boards, wherein the second plurality of circuit boards include a second memory circuit board and second plurality of compute circuit boards; and
a second plurality of second electromagnetic waveguides to communicate millimeter wave data signals, wherein each second electromagnetic waveguides communicatively couples the second memory circuit board to a corresponding one of the second plurality of compute circuit boards.

7. The rack of claim 5, wherein the first and second sets of compute circuit boards each comprise eight compute circuit boards.

8. The rack of claim 1, wherein the first set of connectors comprises eight connectors.

9. A rack comprising:
a plurality of racks comprising a first rack and a second rack, wherein each rack of the plurality of racks has a plurality of circuit boards;
a plurality of electromagnetic waveguides to carry millimeter wave data signals, wherein the plurality of electromagnetic waveguides include a first electromagnetic waveguide communicatively coupled to at least one board of the plurality of circuit boards of the first rack and a second electromagnetic waveguide communicatively coupled to at least one board of the plurality of circuit boards of the second rack; and
a switch arranged between the first rack and the second rack, wherein the switch includes a plurality of waveguide connectors to mate with the plurality of electromagnetic waveguides, and wherein the waveguide connectors include a first waveguide connector to mate with the first electromagnetic waveguide to communicatively couple the first electromagnetic waveguide to the switch and a second waveguide connector to mate with the second electromagnetic waveguide to communicatively couple the second electromagnetic waveguide to the switch.

10. The rack of claim 9, wherein each electromagnetic waveguide carries the millimeter wave data signals at about 50 to 100 gigabits per second during operation of the rack.

11. The rack of claim 10, wherein the millimeter wave data signals have a carrier frequency range of about 60 to 120 gigahertz.

12. The rack of claim 9, wherein the switch is connected to 128 circuit boards of the plurality of circuit boards of the plurality of racks.

13. The rack of claim 9, wherein each electromagnetic waveguide is coupled to at least one board of the plurality of circuit boards of the plurality of racks at a board coupling point and to the switch at a switch coupling point, and wherein a Manhattan distance between the board coupling point and the switch coupling point is no greater than about 10 feet.

14. The rack of claim 9, wherein each electromagnetic waveguide is at least 7 feet long.

15. The rack of claim 9, wherein (i) each electromagnetic waveguide carries the millimeter wave data signals at about 50 to 100 gigabits per second during operation of a rack group, (ii) each electromagnetic waveguide is at least 7 feet long, and (iii) the switch has a radix of at least 128.

16. The rack of claim 9, wherein a rack group comprises eight racks arranged approximately collinear, wherein the switch is arranged at a middle of the eight racks.

17. A switch comprising:
a first set of line cards having optical connectors to mate with corresponding connectors of a plurality of spine switches to communicatively couple a switch to the plurality of spine switches;

a second set of line cards having optical connectors to mate with corresponding connectors of a plurality of circuit boards to communicatively couple the switch to the plurality of circuit boards; and a plurality of electromagnetic waveguides, wherein each electromagnetic waveguide communicatively couples at least one line card of the first set of line cards to at least one line card of the second set of line cards to communicate millimeter wave data signals between the at least one line card of the first set of line cards and the at least one line card of the second set of line cards.

18. The switch of claim 17, wherein each electromagnetic waveguide carries the millimeter wave data signals at about 50 to 100 gigabits per second during operation of the switch.

19. The switch of claim 18, wherein the millimeter wave data signals have a carrier frequency range of about 60 to 120 gigahertz.

20. The switch of claim 17, further comprising a plurality of waveguide connectors to mate with the plurality of electromagnetic waveguides, wherein the first and second sets of line cards are arranged on a first side of the switch and the plurality of waveguide connectors are arranged on a second side of the switch arranged opposite the first side.

21. The switch of claim 20, wherein the plurality of waveguide connectors comprises 16 rows of waveguide connectors that are vertically spaced from one another.

22. The switch of claim 21, wherein each row of waveguide connectors comprises eight waveguide connectors.

23. The switch of claim 22, wherein the rows of waveguide connectors comprise a first set of waveguide connector rows and a second set of waveguide connector rows arranged below the first set of waveguide connector rows.

24. The switch of claim 17, wherein each electromagnetic waveguide comprises a core formed from a dielectric material.

* * * * *